(12) United States Patent
Hatanaka et al.

(10) Patent No.: US 7,956,897 B2
(45) Date of Patent: Jun. 7, 2011

(54) IMAGE COMBINING DEVICE AND IMAGING APPARATUS

(75) Inventors: Haruo Hatanaka, Kyoto (JP); Takashi Iida, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 825 days.

(21) Appl. No.: 11/848,887

(22) Filed: Aug. 31, 2007

(65) Prior Publication Data

US 2008/0056613 A1    Mar. 6, 2008

(30) Foreign Application Priority Data

Aug. 31, 2006    (JP) .................................. 2006-235671

(51) Int. Cl.
*H04N 5/228* (2006.01)
(52) U.S. Cl. .................................. 348/208.4; 348/222.1
(58) Field of Classification Search ............... 348/208.4, 348/208.6, 222.1
See application file for complete search history.

(56) References Cited

U.S. PATENT DOCUMENTS

| | | | |
|---|---|---|---|
| 2002/0154240 A1* | 10/2002 | Tamai et al. | 348/345 |
| 2006/0012830 A1 | 1/2006 | Aiso | |
| 2007/0035630 A1* | 2/2007 | Lindenstruth et al. | 348/208.99 |
| 2007/0242900 A1* | 10/2007 | Chen et al. | 382/294 |
| 2009/0115856 A1 | 5/2009 | Washisu | |
| 2009/0135272 A1* | 5/2009 | Ozluturk | 348/222.1 |
| 2010/0091184 A1* | 4/2010 | Nitta | 348/448 |

FOREIGN PATENT DOCUMENTS

| | | |
|---|---|---|
| JP | 6-121218 A | 4/1994 |
| JP | 9-261526 | 10/1997 |
| JP | 2000-217032 | 8/2000 |
| JP | 2004-219765 A | 8/2004 |
| JP | 2004-221992 | 8/2004 |
| JP | 2006-33062 A | 2/2006 |
| JP | 2006-74693 | 3/2006 |
| JP | 2006-246309 A | 9/2006 |
| JP | 2006-270523 A | 10/2006 |

OTHER PUBLICATIONS

Japanese Office Action for corresponding JP Application No. 2006-235671, dated Feb. 15, 2011, pp. 1-7, Japan.

\* cited by examiner

*Primary Examiner* — Hung H Lam
(74) *Attorney, Agent, or Firm* — Ditthavong Mori & Steiner, P.C.

(57) ABSTRACT

A plurality of divided exposure images (first to fourth images) are obtained by dividing a normal exposure time. By an image matching method, a motion detection circuit calculates a plurality of cumulative total correlation values between different divided exposure images, and searches the plurality of cumulative total correlation values for the smallest cumulative total correlation value, thereby calculating a motion vector between the different divided exposure images. In addition, based on the level of the smallest cumulative total correlation value, the level of reliability B[i] indicating the accuracy of the motion vector is calculated. An image combining circuit uses the level of reliability B[i] as a mixture proportion. The image combining circuit positions the divided exposure images based on the motion vector, and combines the divided exposure images together one on top of another in mixture proportions (B[i]), so as to form one still image that suffers less from camera shake.

5 Claims, 24 Drawing Sheets

FIG.5
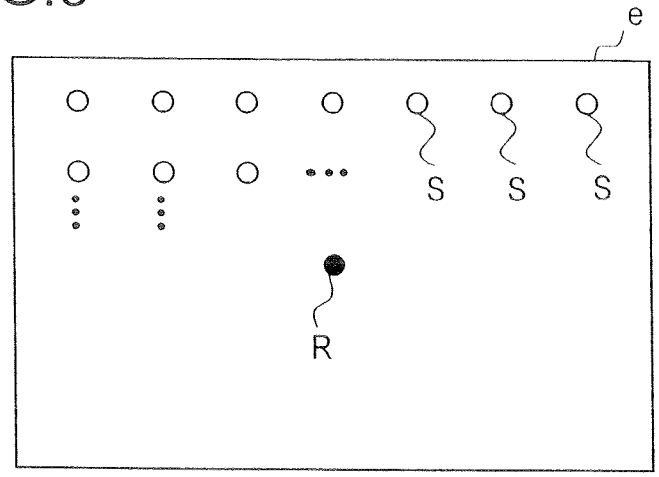
FIG.6
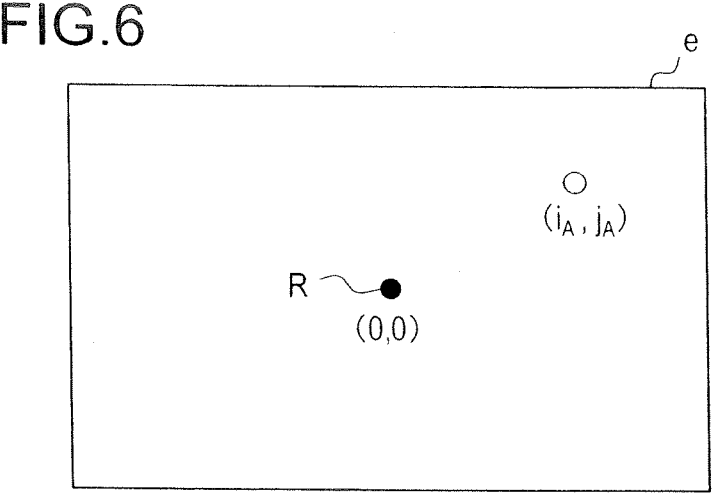
FIG.7
| $(i_A-2, j_A-2)$ | $(i_A-2, j_A-1)$ | $(i_A-2, j_A)$ | $(i_A-2, j_A+1)$ | $(i_A-2, j_A+2)$ |
|---|---|---|---|---|
| $(i_A-1, j_A-2)$ | $(i_A-1, j_A-1)$ | $(i_A-1, j_A)$ | $(i_A-1, j_A+1)$ | $(i_A-1, j_A+2)$ |
| $(i_A, j_A-2)$ | $(i_A, j_A-1)$ | $(i_A, j_A)$ | $(i_A, j_A+1)$ | $(i_A, j_A+2)$ |
| $(i_A+1, j_A-2)$ | $(i_A+1, j_A-1)$ | $(i_A+1, j_A)$ | $(i_A+1, j_A+1)$ | $(i_A+1, j_A+2)$ |
| $(i_A+2, j_A-2)$ | $(i_A+2, j_A-1)$ | $(i_A+2, j_A)$ | $(i_A+2, j_A+1)$ | $(i_A+2, j_A+2)$ |

FIG.8

FOR EACH DETECTION REGION

| ① AVERAGE VALUE Vave OF CUMULATIVE TOTAL CORRELATION VALUES |
|---|
| ② FIRST BLOCK DATA <br>     { POTENTIAL SMALLEST CORRELATION VALUE $V_A$ <br>       POSITION $P_A$ OF POTENTIAL SMALLEST CORRELATION VALUE $V_A$ <br>       NEIGHBORHOOD CUMULATIVE TOTAL CORRELATION VALUE $V(i_A+p, j_A+q)$ <br><br> SECOND BLOCK DATA <br>     { POTENTIAL SMALLEST CORRELATION VALUE $V_B$ <br>       POSITION $P_B$ OF POTENTIAL SMALLEST CORRELATION VALUE $V_B$ <br>       NEIGHBORHOOD CUMULATIVE TOTAL CORRELATION VALUE $V(i_B+p, j_B+q)$ <br><br> THIRD BLOCK DATA <br>     { POTENTIAL SMALLEST CORRELATION VALUE $V_C$ <br>       POSITION $P_C$ OF POTENTIAL SMALLEST CORRELATION VALUE $V_C$ <br>       NEIGHBORHOOD CUMULATIVE TOTAL CORRELATION VALUE $V(i_C+p, j_C+q)$ <br><br> FOURTH BLOCK DATA <br>     { POTENTIAL SMALLEST CORRELATION VALUE $V_D$ <br>       POSITION $P_D$ OF POTENTIAL SMALLEST CORRELATION VALUE $V_D$ <br>       NEIGHBORHOOD CUMULATIVE TOTAL CORRELATION VALUE $V(i_D+p, j_D+q)$ |
| ③ NUMBER Nf OF POTENTIAL SMALLEST CORRELATION VALUES |

FIG.14

| Vmin[i] | AVERAGE OF Vmin OF VALID REGIONS OF $i$-th IMAGE IN THIS CASE, Vmin[1]=min(Vmin[2],Vmin[3], Vmin[4]) |
|---|---|
| Vave[i] | AVERAGE OF Vave OF VALID REGIONS OF $i$-th IMAGE IN THIS CASE, Vave[1]=max(Vave[2],Vave[3], Vave[4]) |
| Nf[i] | AVERAGE OF Nf OF VALID REGIONS OF $i$-th IMAGE IN THIS CASE, Nf[1]=min(Nf[2],Nf[3], Nf[4]) |
| Nval[i] | NUMBER OF VALID REGIONS OF $i$-th IMAGE IN THIS CASE, Nval[1]=max(Nval[2],Nval[3], Nval[4]) |

|  | V min[i] | $\dfrac{1}{V\min[i]}$ | $B[i] = \dfrac{\dfrac{1}{V\min[i]}}{\sum_{i=1}^{4}\left(\dfrac{1}{V\min[i]}\right)}$ |
|---|---|---|---|
| FIRST IMAGE | 50 | 0.02 | 0.34 |
| SECOND IMAGE | 50 | 0.02 | 0.34 |
| THIRD IMAGE | 70 | 0.014 | 0.24 |
| FOURTH IMAGE | 200 | 0.005 | 0.08 |

$$\sum_{i=1}^{4}\left(\dfrac{1}{V\min[i]}\right) = 0.059$$

|  | FIRST IMAGE | SECOND IMAGE | THIRD IMAGE | FOURTH IMAGE |  |
|---|---|---|---|---|---|
| FIRST IMAGE |  | $Vmin_{12}$ | $Vmin_{13}$ | $Vmin_{14}$ | → $SUM_{Vmin}[1]$ |
| SECOND IMAGE | $Vmin_{12}$ |  | $Vmin_{23}$ | $Vmin_{24}$ | → $SUM_{Vmin}[2]$ |
| THIRD IMAGE | $Vmin_{13}$ | $Vmin_{23}$ |  | $Vmin_{34}$ | → $SUM_{Vmin}[3]$ |
| FOURTH IMAGE | $Vmin_{14}$ | $Vmin_{24}$ | $Vmin_{34}$ |  | → $SUM_{Vmin}[4]$ |

FIG.21

| | FIRST IMAGE | SECOND IMAGE | THIRD IMAGE | FOURTH IMAGE | $SUM_{Vmin}[i]$ | $\dfrac{1}{SUM_{Vmin}[i]}$ | $BV_{min}[i] = \dfrac{\dfrac{1}{SUM_{Vmin}[i]}}{\sum_{i=1}^{4}\left(\dfrac{1}{SUM_{Vmin}[i]}\right)}$ |
|---|---|---|---|---|---|---|---|
| FIRST IMAGE | | 50 | 70 | 200 | 320 | 1/320 | 0.267 |
| SECOND IMAGE | 50 | | 60 | 180 | 290 | 1/290 | 0.294 |
| THIRD IMAGE | 70 | 60 | | 170 | 300 | 1/300 | 0.284 |
| FOURTH IMAGE | 200 | 180 | 170 | | 550 | 1/550 | 0.155 |

$$\sum_{i=1}^{4}\left(\dfrac{1}{SUM_{Vmin}[i]}\right)=0.011725$$

FIG.22
FIRST IMAGE   SECOND IMAGE   THIRD IMAGE   FOURTH IMAGE
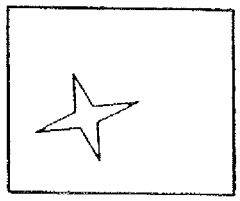 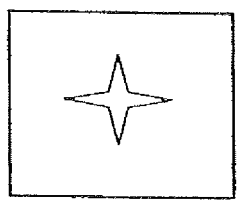 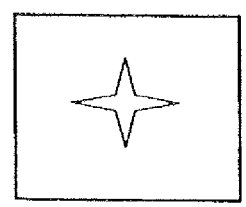 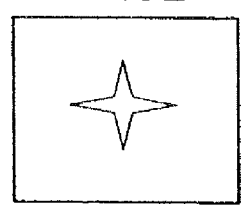

IMAGE COMBINING DEVICE AND IMAGING APPARATUS

This nonprovisional application claims priority under 35 U.S.C. §119(a) on Patent Application No. 2006-235671 filed in Japan on Aug. 31, 2006, the entire contents of which are hereby incorporated by reference.

BACKGROUND OF THE INVENTION

1. Field of the Invention

The present invention relates to image combining devices that combine a plurality of images and to image combining methods for combining a plurality of images. The present invention also relates to imaging apparatuses that adopt such image combining devices or image combining methods.

2. Description of Related Art

In recent years, an image stabilization technique, which is a technique for reducing camera shake when shooting with a camera, has been actively studied. Irrespective of whether a stabilization target is a still image or a moving image, the image stabilization technique can be broken down into a technique for detecting camera shake and a technique for stabilizing an image based on the detection result.

As a method for detecting camera shake, there are a method that uses a sensor (an angular speed sensor) and an electronic method that analyzes an image for detection. As for image stabilization, there are optical image stabilization by which an image is stabilized by the driving of an optical system and electronic image stabilization by which an image is stabilized by image processing.

As a method for performing image stabilization for a still image (or a moving image), there are a method by which camera shake is detected with a sensor so that optical image stabilization is performed based on the detection result, a method by which camera shake is detected with a sensor so that electronic image stabilization is performed based on the detection result, and a method by which camera shake is detected by an image analysis so that electronic image stabilization is performed based on the detection result.

As a method by which camera shake is detected by an image analysis so that electronic image stabilization is performed based on the detection result, image stabilization by image addition has come into practical use. The image stabilization by image addition is performed as follows. A plurality of divided exposure images (short-time exposure images) G1 to G4 exposed for an exposure time T2 obtained by dividing a normal exposure time T1 are positioned in such a way as to cancel a difference between them, and are then combined together one on top of another. In this way, one still image that suffers less from camera shake is formed (see FIG. 24).

As a method for detecting a difference (in other words, a motion) between images by image processing, there are an image matching method, a feature point matching method, a gradient method, and the like. The image matching method is performed as follows. Two images are placed one on top of another and are gradually shifted from each other, so as to find out a position (a relative positional difference between them) where the smallest difference is observed between the two images. In this case, frequently used as a value representing the difference between the two images is the sum of absolute difference (SAD) or the sum of squared difference (SSD) between the pixel values of these two images.

The image matching method is classified into a pixel-by-pixel matching method (a block matching method) and a representative point matching method. By the pixel-by-pixel matching method, the difference between two images to be compared is calculated by using the pixel values of all pixels present in a portion where the two images overlap each other. On the other hand, by the representative point matching method, the difference between two images is calculated by using a pixel value of a representative point that is set at intervals of several to several tens of pixels. Since the representative point matching method allows easy implementation by hardware and can realize practical detection accuracy, it is widely used in imaging apparatuses such as digital video cameras.

Conventional image stabilization by image addition is performed as follows. A plurality of divided exposure images are individually positioned based on the image features thereof with reference to a reference image (typically, the first divided exposure image) selected from among the plurality of divided exposure images, and are then simply added together to form one still image. FIG. 25 shows a typical example of how a plurality of divided exposure images G1 to G4 are combined together to form one still image as a composite image. It is to be noted that FIG. 25 shows a case in which all the divided exposure images suffer less from image blur.

In general, the exposure time of each divided exposure image is set to be short enough to make camera shake negligible. However, a plurality of divided exposure images may include a divided exposure image with significant image blur caused by camera shake or moving subject. In such a case, the divided exposure images are positioned with a lower degree of accuracy. As a result, as shown in FIG. 26, a still image obtained as a composite image blurs (in FIG. 26, there is significant blur in the divided exposure image G4).

In addition, the first divided exposure image, for example, of a plurality of divided exposure images is set as a reference image, and the plurality of divided exposure images are then positioned with reference to the reference image thus set. However, the first divided exposure image fixed as a reference image is not always the most suitable reference image. The reason is as follows. The positioning is performed by converting the image coordinates of the divided exposure images other than the reference image into an image coordinate system of the reference image. This coordinate transformation generally entails interpolation of pixel values, resulting in some image degradation in the divided exposure images other than the reference image. This makes it preferable to select a reference image that helps minimize such image degradation.

SUMMARY OF THE INVENTION

According to one aspect of the present invention, a first image combining device is provided with a motion vector calculating portion calculating a motion vector between different divided exposure images of a plurality of divided exposure images obtained as a result of continuous shooting. Here, the first image combining device positions the divided exposure images based on the motion vector thus calculated, and combines the divided exposure images together one on top of another so as to form one composite image. The first image combining device is further provided with a mixture proportion calculating portion calculating, based on information commensurate with a motion of an image between the different divided exposure images, the mixture proportion of each divided exposure image to the composite image. The first image combining device combines the divided exposure images together one on top of another in mixture proportions thus calculated so as to form the composite image.

Specifically, for example, in the first image combining device, the motion vector calculating portion calculates the motion vector based on a plurality of cumulative total correlation values between the different divided exposure images, the plurality of cumulative total correlation values being obtained by an image matching method. The mixture proportion calculating portion calculates the mixture proportions based on the plurality of cumulative total correlation values used as the information.

Specifically, for example, in the first image combining device, each divided exposure image is provided with a detection region. The motion vector calculating portion calculates, by the image matching method, m cumulative total correlation values (m is an integer equal to or greater than 2) between the different divided exposure images with respect to the detection region. The mixture proportion calculating portion calculates the mixture proportions based on one or more evaluation values of first, second, and third evaluation values. The first evaluation value is an evaluation value based on the smallest cumulative total correlation value of the m cumulative total correlation values, or the first evaluation value is an evaluation value based on a cumulative total correlation value equal to or smaller than a value obtained by increasing the smallest cumulative total correlation value according to a predetermined rule. The second evaluation value is an evaluation value based on a value commensurate with the average of the m cumulative total correlation values. The third evaluation value is an evaluation value based on the number of smallest cumulative total correlation values of the m cumulative total correlation values, or the third evaluation value is an evaluation value based on the number of cumulative total correlation values equal to or smaller than a value obtained by increasing the smallest cumulative total correlation value according to a predetermined rule.

Specifically, for example, in the first image combining device, each divided exposure image is provided with a plurality of detection regions. The motion vector calculating portion calculates, by the image matching method, m cumulative total correlation values (m is an integer equal to or greater than 2) between the different divided exposure images with respect to each detection region. The image combining device is further provided with a checking portion checking whether each detection region is valid or invalid. Based on the m cumulative total correlation values, the motion vector calculating portion obtains, for each detection region, a vector indicating a motion of an image within the detection region as a regional motion vector. The motion vector calculating portion calculates, as a motion vector of the entire image, the motion vector from the regional motion vector corresponding to the detection region found to be valid. The mixture proportion calculating portion calculates the mixture proportions based on one or more evaluation values of first, second, third, and fourth evaluation values. The first evaluation value is calculated based on the smallest cumulative total correlation value of the m cumulative total correlation values, the smallest cumulative total correlation value being obtained for each detection region, or the first evaluation value is calculated based on a cumulative total correlation value equal to or smaller than a value obtained by increasing the smallest cumulative total correlation value according to a predetermined rule, the cumulative total correlation value being obtained for each detection region. The second evaluation value is calculated based on a value commensurate with the average of the m cumulative total correlation values, the value being obtained for each detection region. The third evaluation value is calculated based on the number of smallest cumulative total correlation values of the m cumulative total correlation values, the number being obtained for each detection region, or the third evaluation value is calculated based on the number of cumulative total correlation values equal to or smaller than a value obtained by increasing the smallest cumulative total correlation value according to a predetermined rule, the number being obtained for each detection region. The fourth evaluation value is calculated based on the number of detection regions of the plurality of detection regions, the number of detection regions being found to be valid by the checking portion.

According to another aspect of the present invention, a second image combining device is provided with a motion vector calculating portion calculating a motion vector between different divided exposure images of a plurality of divided exposure images obtained as a result of continuous shooting. Here, second image combining device sets one of the plurality of divided exposure images as a reference image, positions the divided exposure images based on the motion vector with respect to the reference image, and combines the divided exposure images together one on top of another so as to form one composite image. The image combining device is further provided with a reference image setting portion operable to change the reference image. The reference image setting portion sets the reference image based on information commensurate with a motion of an image between the different divided exposure images.

Specifically, for example, in the second image combining device, the motion vector calculating portion calculates the motion vector based on a plurality of cumulative total correlation values between the different divided exposure images, the plurality of cumulative total correlation values being obtained by an image matching method. The reference image setting portion sets the reference image based on the plurality of cumulative total correlation values used as the information.

Specifically, for example, in the second image combining device, each divided exposure image is provided with a detection region. The motion vector calculating portion calculates, by the image matching method, m cumulative total correlation values (m is an integer equal to or greater than 2) between the different divided exposure images with respect to the detection region. The reference image setting portion sets the reference image based on one or more evaluation values of first, second, and third evaluation values. The first evaluation value is an evaluation value based on the smallest cumulative total correlation value of the m cumulative total correlation values, or the first evaluation value is an evaluation value based on a cumulative total correlation value equal to or smaller than a value obtained by increasing the smallest cumulative total correlation value according to a predetermined rule. The second evaluation value is an evaluation value based on a value commensurate with the average of the m cumulative total correlation values. The third evaluation value is an evaluation value based on the number of smallest cumulative total correlation values of the m cumulative total correlation values, or the third evaluation value is an evaluation value based on the number of cumulative total correlation values equal to or smaller than a value obtained by increasing the smallest cumulative total correlation value according to a predetermined rule.

Specifically, for example, in the second image combining device, each divided exposure image is provided with a plurality of detection regions. The motion vector calculating portion calculates, by the image matching method, m cumulative total correlation values (m is an integer equal to or greater than 2) between the different divided exposure images with respect to each detection region. The image combining device is further provided with a checking portion checking whether each detection region is valid or invalid. Based on the m cumulative total correlation values, the motion vector calculating portion obtains, for each detection region, a vector indicating a motion of an image within the detection region as a regional motion vector. The motion vector calculating portion calculates, as a motion vector of the entire image, the motion vector from the regional motion vector corresponding to the detection region found to be valid. The reference image setting portion sets the reference image based on one or more evaluation values of first, second, third, and fourth evaluation values. The first evaluation value is calculated based on the smallest cumulative total correlation value of the m cumulative total correlation values, the smallest cumulative total correlation value being obtained for each detection region, or the first evaluation value is calculated based on a cumulative total correlation value equal to or smaller than a value obtained by increasing the smallest cumulative total correlation value according to a predetermined rule, the cumulative total correlation value being obtained for each detection region. The second evaluation value is calculated based on a value commensurate with the average of the m cumulative total correlation values, the value being obtained for each detection region. The third evaluation value is calculated based on the number of smallest cumulative total correlation values of the m cumulative total correlation values, the number being obtained for each detection region, or the third evaluation value is calculated based on the number of cumulative total correlation values equal to or smaller than a value obtained by increasing the smallest cumulative total correlation value according to a predetermined rule, the number being obtained for each detection region. The fourth evaluation value is calculated based on the number of detection regions of the plurality of detection regions, the number of detection regions being found to be valid by the checking portion.

For example, in the first or second image combining device, consider a case where the different divided exposure images are first and second divided exposure images. In this case, the cumulative total correlation value represents the correlation between the images of the detection regions provided in the first and second divided exposure images when the first and second divided exposure images are shifted from each other. The higher the correlation, the smaller the cumulative total correlation value.

According to another aspect of the present invention, an imaging apparatus is provided with an imaging portion performing continuous shooting and outputting a plurality of image data indicating a plurality of divided exposure images; and the first or second image combining device. The first or second image combining device forms the composite image based on the plurality of image data.

According to another aspect of the present invention, a first image combining method is provided with the steps of: calculating a motion vector between different divided exposure images of a plurality of divided exposure images obtained as a result of continuous shooting; and positioning the divided exposure images based on the motion vector thus calculated and combining the divided exposure images together one on top of another so as to form one composite image. Based on information commensurate with a motion of an image between the different divided exposure images, the mixture proportion of each divided exposure image to the composite image is calculated. The divided exposure images are combined together one on top of another in mixture proportions thus calculated so as to form the composite image.

According to another aspect of the present invention, a second image combining method is provided with the steps of: calculating a motion vector between different divided exposure images of a plurality of divided exposure images obtained as a result of continuous shooting; setting one of the plurality of divided exposure images as a reference image; and positioning the divided exposure images based on the motion vector thus calculated with respect to the reference image, and combining the divided exposure images together one on top of another so as to form one composite image. The reference image can be changed based on information commensurate with a motion of an image between the different divided exposure images.

BRIEF DESCRIPTION OF THE DRAWINGS

FIG. 5 is a diagram showing a representative point and sampling points in each small region shown in FIG. 4;

FIG. 6 is a diagram showing pixel positions of a representative point and a sampling point giving the smallest cumulative total correlation value in each small region shown in FIG. 4;

FIG. 7 is a diagram showing pixel positions of a pixel giving the smallest cumulative total correlation value and pixels located in the neighborhood thereof;

FIG. 8 is a list of output data of the calculation circuit shown in FIG. 3;

FIG. 14 is a table showing different values involved in the calculation of the level of reliability performed by the reliability level calculating portion shown in FIG. 13;

FIG. 21 is a table showing a specific example of different values calculated in the third embodiment of the invention;

FIG. 22 is a diagram showing an example of a plurality of divided exposure images to be combined together one on top of another;

FIG. 23 is a diagram showing a modified example of the pattern shown in FIG. 11A and the like;

DETAILED DESCRIPTION OF PREFERRED EMBODIMENTS

Figure 1:
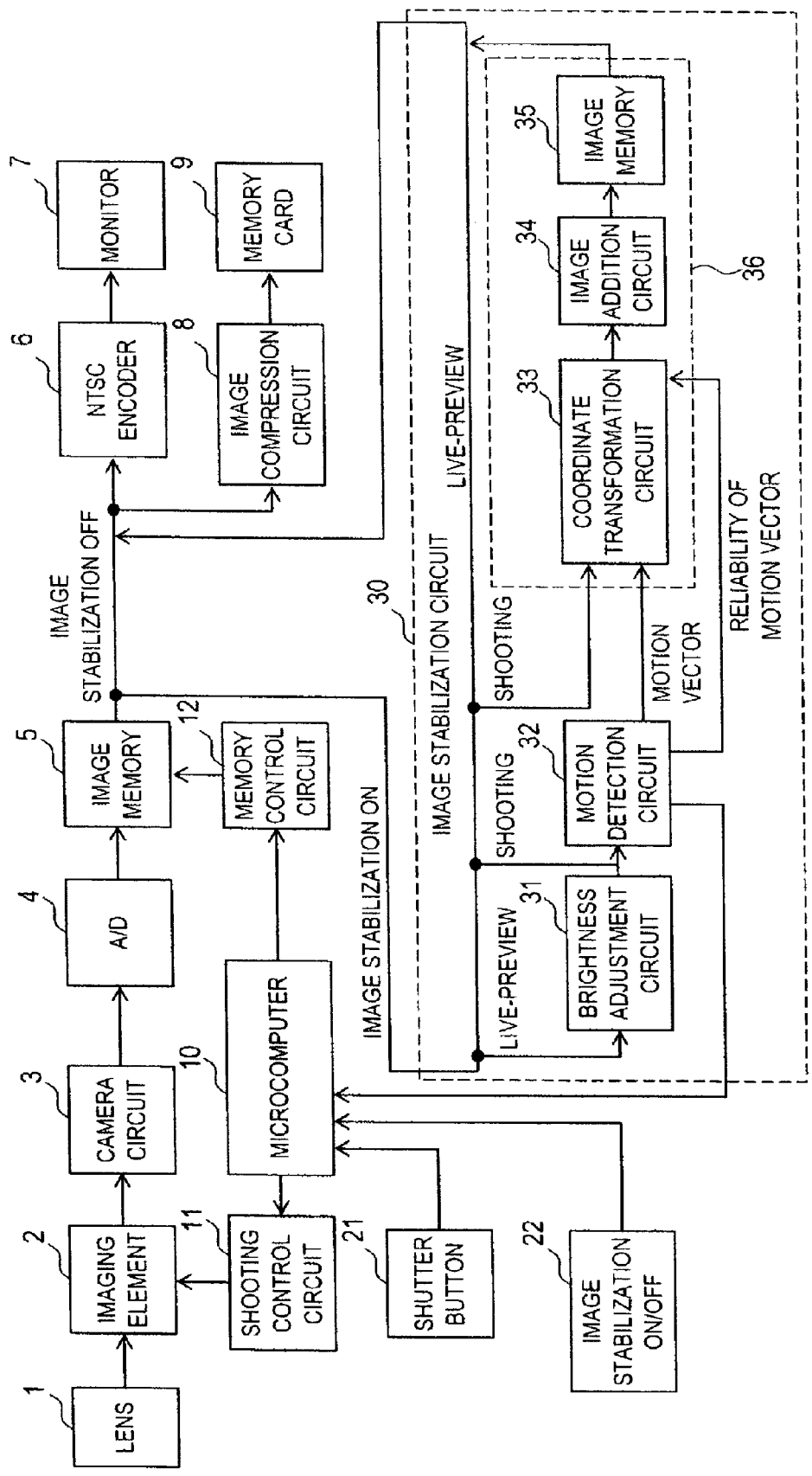
FIG. 1 is a diagram showing the entire configuration of an imaging apparatus according to embodiments of the present invention.

Hereinafter, with reference to accompanying drawings, embodiments of the present invention will be described. It is to be noted that such components as find their counterparts among different drawings are identified with the same reference numerals, and overlapping explanations will be omitted unless necessary.

First Embodiment

Hereinafter, a first embodiment will be described by way of an example in which the present invention is applied to an imaging apparatus. FIG. 1 is a diagram showing the entire configuration of an imaging apparatus according to the first embodiment of the present invention. The imaging apparatus shown in FIG. 1 is, for example, a digital still camera or a digital video camera, and can take at least a still image. The imaging apparatus shown in FIG. 1 is composed of different component blocks represented by reference numerals 1 to 12, 21, 22, and 30. An image stabilization circuit represented by reference numeral 30 includes a brightness adjustment circuit 31, a motion detection circuit 32, a coordinate transformation circuit 33, an image addition circuit 34, and an image memory 35. The coordinate transformation circuit 33, the image addition circuit 34, and the image memory 35 together form an image combining circuit 36. In the following description, what is referred to simply as an "imaging apparatus" always refers to the imaging apparatus shown in FIG. 1.

An imaging element 2 is composed of a CCD (charge-coupled device), a C-MOS (complementary metal oxide semiconductor) image sensor, or the like. The imaging element 2 photoelectrically converts an optical image incident through a lens 1, and outputs the optical image as an electric signal. The output signal of the imaging element 2 is transmitted in the form of an RGB signal, for example, to a camera circuit 3 including a CDS (correlated double sampling) circuit and an AGC (auto gain control) circuit. In the camera circuit 3, the output signal of the imaging element 2 is subjected to correlated dual sampling by the CDS circuit, and is then subjected to gain adjustment by the AGC circuit so as to optimize the amplitude thereof. The output signal of the camera circuit 3 is converted by an A/D converter 4 into image data serving as a digital video signal. The image data from the A/D converter 4 is written to an image memory 5. A shooting control circuit 11 sets an optimum exposure time for the imaging element 2 based on the brightness information obtained from a metering circuit (not shown) that measures the subject brightness.

The image memory 5 is controlled by a microcomputer 10 via a memory control circuit 12. The shooting control circuit 11 is controlled by the microcomputer 10. To the microcomputer 10, instructional information is sent for instructing operation of a shutter button 21 and an image stabilization ON/OFF switch 22. When shooting, the imaging apparatus operates in two modes: a normal shooting mode and an image stabilization shooting mode. Depending on the operation of the image stabilization ON/OFF switch 22, the operation mode is switched between the normal shooting mode and the image stabilization shooting mode.

First, the operation of the imaging apparatus when the normal shooting mode is set will be described. When the shutter button 21 is not depressed, image data obtained by shooting at predetermined intervals (e.g., 1/60 seconds) is written to the image memory 5, is then converted into an NTSC signal by an NTSC (National Television Standards Committee) encoder 6, and is then transmitted to a monitor 7 formed with a liquid crystal display or the like. As a result, an image represented by the image data is displayed on the monitor 7. In this way, the image data written to the image memory 5 is directly transmitted to the NTSC encoder 6 and is then displayed. Such display is called "live-preview".

Depression of the shutter button 21 initiates shooting of a still image, and the image data obtained by this shooting is written to the image memory 5. Then, an image represented by this image data is displayed on the monitor 7. At the same time, the image data is encoded into a predetermined compressed data format such as JPEG (Joint Photographic Experts Group) by an image compression circuit 8, and is then stored in a memory card 9 as an image file.

Next, the operation of the imaging apparatus when the image stabilization shooting mode is set will be described. Unless otherwise noted, the following description deals with the operation in the image stabilization shooting mode.

When the image stabilization shooting mode is set, image data written to the image memory 5 is transferred to the image stabilization circuit 30.

When the shutter button 21 is not depressed, image data obtained by shooting at predetermined intervals (e.g., 1/60 seconds) is written to the image memory 5, and is then transferred to the image stabilization circuit 30. When the shutter button 21 is not depressed, the image data transferred to the image stabilization circuit 30 is transmitted to the monitor 7 via the NTSC encoder 6 for live-preview, and is also transmitted to the brightness adjustment circuit 31. The brightness adjustment circuit 31 reduces the brightness level of the inputted image data in such a way that the brightness of the inputted image (image data) becomes approximately the same as that of a divided exposure image, which will be described later, thereby making the inputted image resemble the divided exposure image. Then, the brightness adjustment circuit 31 outputs the resultant image data to the motion detection circuit 32.

The motion detection circuit 32 performs such a process as calculation of a motion vector between different images inputted thereto. When the shutter button 21 is not depressed, the motion detection circuit 32 performs such a process as calculation of a motion vector between an image represented by the previously inputted image data and an image represented by the currently inputted image data. The motion vectors calculated one after another when the shutter button 21 is not depressed are used for processing (panning/tilting state check) in step S48 of FIG. 10, which will be described later, for instance.

When the shutter button 21 is depressed, the microcomputer 10 gives an instruction to the shooting control circuit 11 so as to perform exposures with an exposure time obtained by dividing the above-described optimum exposure time into several pieces of time (for example, four or eight pieces of time; in particular, equal to or greater than three pieces of time, for example). Let the optimum exposure time be T1 and the exposure division number be N. Then, shooting is continuously performed for N times in a row with an exposure time of T1/N. Hereinafter, an image obtained by shooting with an exposure time of T1/N is referred to as a "divided exposure image", and image data representing the divided exposure image is referred to as "divided exposure image data".

A plurality of pieces of divided exposure image data obtained by divided exposures are individually stored in the image memory 5, and are sequentially transferred to the image stabilization circuit 30. Specifically, the pieces of divided exposure image data are sequentially transmitted to the motion detection circuit 32 and the coordinate transformation circuit 33 included in the image stabilization circuit 30.

In the motion detection circuit 32, motion vectors between the first inputted divided exposure image and the divided exposure images that follow are sequentially calculated, and the motion vectors thus calculated are sequentially checked for validity. As will be specifically described later, a motion vector found to be somewhat reliable as a vector representing the motion between the images is valid; a motion vector found to be unreliable is invalid. In addition, an outstanding feature of this embodiment is that the motion detection circuit 32 calculates the level of reliability of each motion vector (a detailed description will be given later).

What is referred to here as the motion vector corresponds to a motion vector of the entire image (an "entire motion vector", which will be described later). The motion detection circuit 32 is controlled by the microcomputer 10, and the different values calculated by the motion detection circuit 32 are fed to the microcomputer 10 if necessary.

When the motion vectors (the entire motion vectors) are found to be valid, based on the motion vector between the first and second divided exposure images, the coordinates of the second divided exposure image inputted to the image stabilization circuit 30 are converted to the coordinates of the first divided exposure image by the coordinate transformation circuit 33 in such a way as to eliminate the displacement from the first divided exposure image (that is, the position of the second divided exposure image is adjusted based on the first divided exposure image). The same processing is performed for the third and fourth divided exposure images. Then, in the image addition circuit 34, the pixel values of the coordinate-transformed second divided exposure image are added to the pixel values of the first divided exposure image. Likewise, the pixel values of the coordinate-transformed third and fourth divided exposure images are added to the pixel values of the resultant composite image, and the addition results are stored in the image memory 35. That is, after elimination of the displacement from the first divided exposure image, the divided exposure images are combined together one on top of another to form a composite image. The composite image thus formed is stored in the image memory 35. An outstanding feature of this embodiment is that, at this point, the pixel values are added together in proportions (mixture proportions) based on the level of reliability of each motion vector described above (a detailed description will be given later).

Since the divided exposure images are each exposed with 1/N of a normal exposure time, the amount of camera shake is also reduced to 1/N as compared when normal exposure is performed. After elimination of the displacement from the first divided exposure image, the divided exposure images are combined together one on top of another to form a composite image. This helps reduce the amount of camera shake of the composite image thus formed to 1/N as compared when the normal exposure is performed. The composite image thus formed represents a still image taken in response to the depression of the shutter button 21. This still image obtained as the composite image is displayed on the monitor 7 via the NTSC encoder 6, and is stored in the memory card 9 via the image compression circuit 8.

On the other hand, when the motion vectors (the entire motion vectors) are found to be invalid, the coordinate transformation circuit 33 does not perform displacement elimination on the second to fourth divided exposure images inputted to the image stabilization circuit 30 after the first divided exposure image. Then, the first divided exposure image and the divided exposure images on which no displacement elimination is performed are combined together one on top of another by the image addition circuit 34. By doing so, it is possible to prevent an image from appearing further blurred as a result of the positions of the divided exposure images being adjusted based on the unreliable motion vectors.

It is to be noted that pixel values of a given image are values of picture signals for the pixels forming the image (for example, a value of a brightness signal, a value of a color-difference signal, and the like).

Description of Motion Detection Circuit

Figure 2:
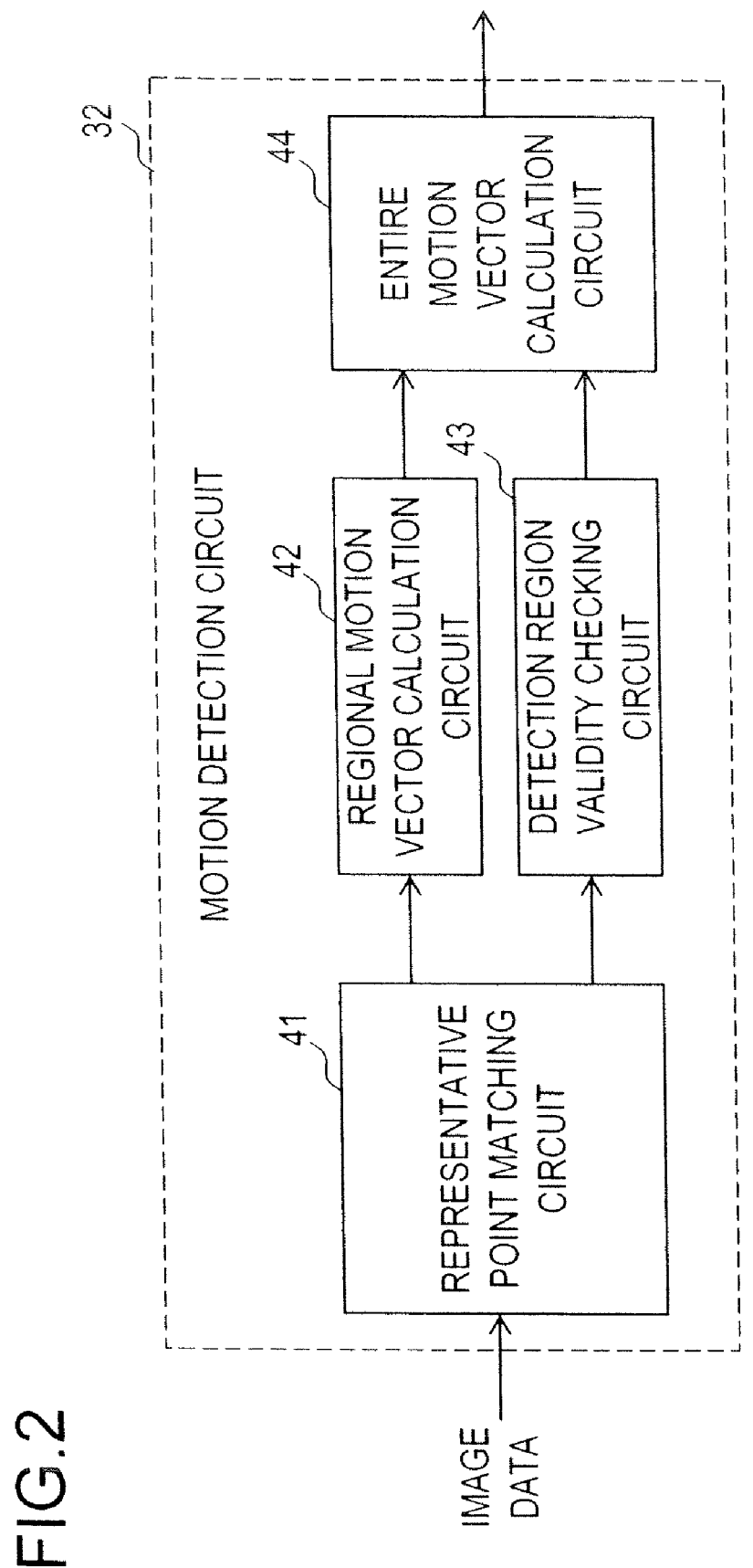
FIG. 2 is an internal block diagram of the motion detection circuit shown in FIG. 1.
Figure 3:
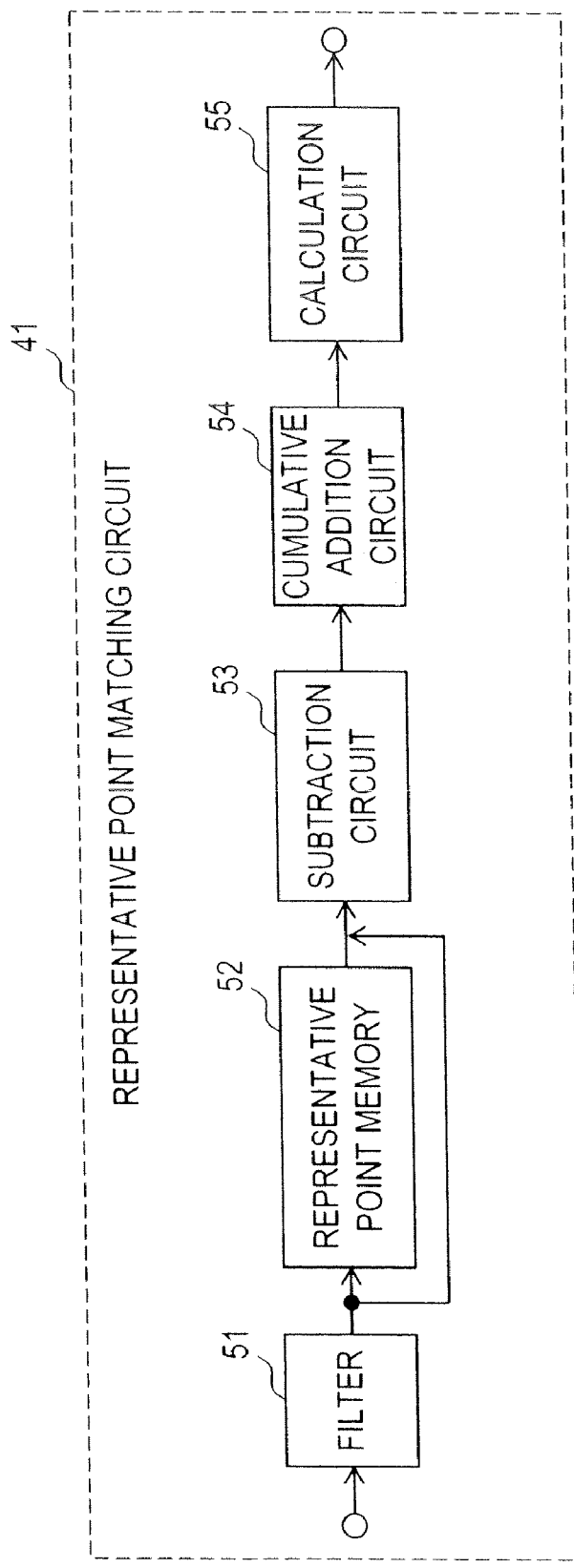
FIG. 3 is an internal block diagram of the representative point matching circuit shown in FIG. 2.

Next, the motion detection circuit 32 shown in FIG. 1 will be described in detail. FIG. 2 is an internal block diagram of the motion detection circuit 32. The motion detection circuit 32 includes a representative point matching circuit 41, a regional motion vector calculation circuit 42, a detection region validity checking circuit 43, and an entire motion vector calculation circuit 44. The functions of the circuit components represented by reference numerals 42 to 44 will be described later with reference to flow charts of FIGS. 9 and 10. First, the representative point matching circuit 41 will be described in detail. FIG. 3 is an internal block diagram of the representative point matching circuit 41. The representative point matching circuit 41 includes a filter 51, a representative point memory 52, a subtraction circuit 53, a cumulative addition circuit 54, and a calculation circuit 55.

Based on a conventionally known representative point matching method, the motion detection circuit 32 detects a motion vector and the like. The motion detection circuit 32 receives one image (image data) after another. Hereinafter, a representative point matching method will be described, taking up a case in which a motion vector and the like between a reference image and a currently inputted image is detected. Typically, for example, the reference image is an image inputted just before the currently inputted image is inputted.

Figure 4:
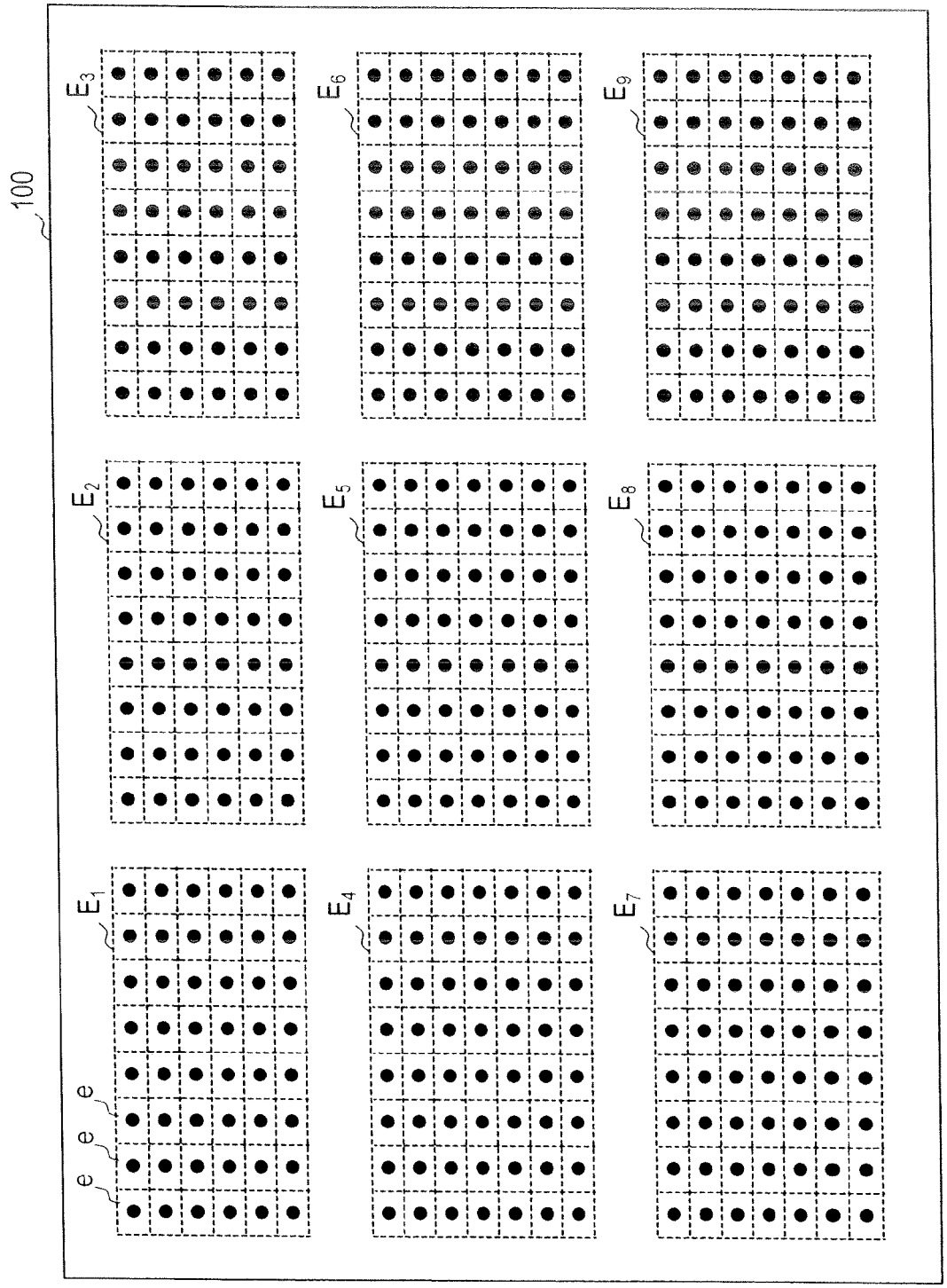
FIG. 4 is a diagram showing motion vector detection regions and small regions defined by the representative point matching circuit shown in FIG. 3.

FIG. 4 shows an image 100 represented by image data fed to the motion detection circuit 32. The image 100 is, for example, the divided exposure image described above, representing the aforementioned reference image or currently inputted image. In the image 100, a plurality of motion vector detection regions are provided. Hereinafter, the motion vector detection region will be referred to simply as the "detection region". For the sake of concreteness, consider a case where nine detection regions $E_1$ to $E_9$ are provided. In the following description, what is referred to simply as the "detection regions" is any or all of the detection regions $E_1$ to $E_9$. The detection regions $E_1$ to $E_9$ are equal in size.

The detection regions $E_1$ to $E_9$ are each divided into a plurality of small regions (detection blocks) "e". In an example shown in FIG. 4, each detection region is divided into 48 small regions "e" (divided into six regions along the vertical direction and divided into eight regions along the horizontal direction). Each small region "e" is composed of, for example, 32×32 pixels (a two-dimensional array of 32 pixels in the vertical direction by 32 pixels in the horizontal direction). As shown in FIG. 5, each small region "e" has a plurality of sampling points S and one representative point R. A plurality of sampling points S of a given small region "e" correspond one-to-one to the pixels (except for a representative point R) forming the given small region "e".

Figure 27:
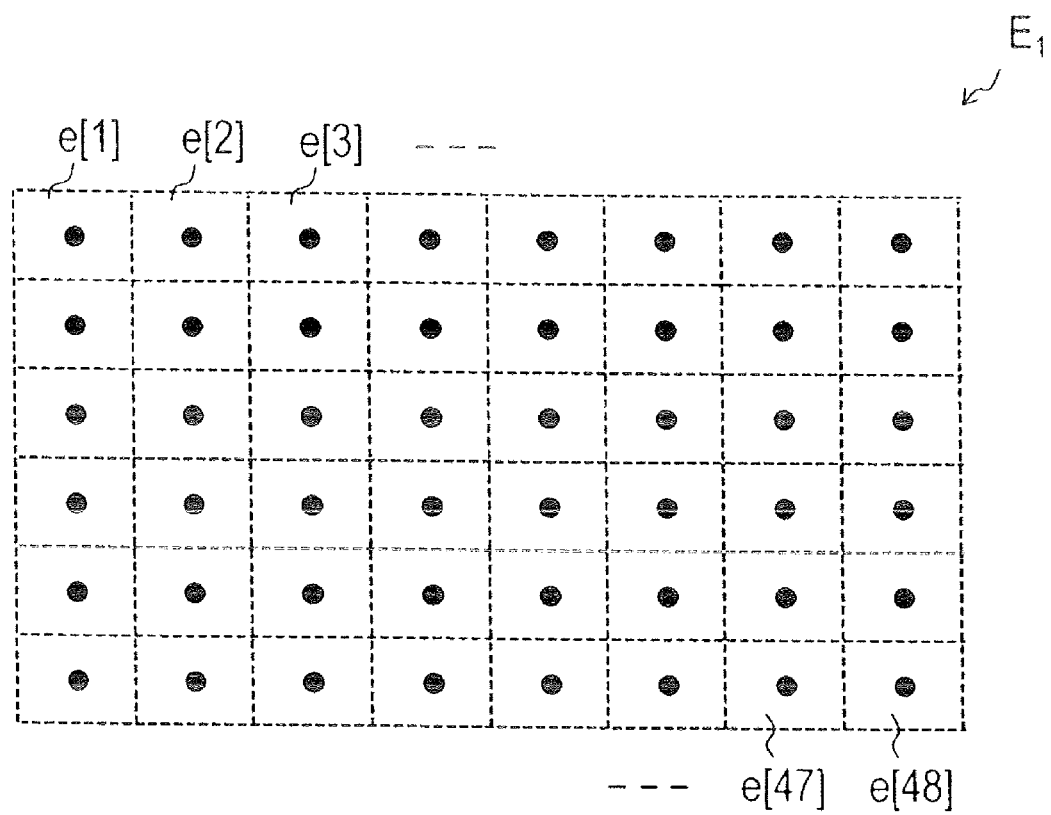
FIG. 27 is an enlarged view of one motion vector detection region shown in FIG. 4 according to the embodiments of the invention, explaining a representative point matching method.
Figure 28:
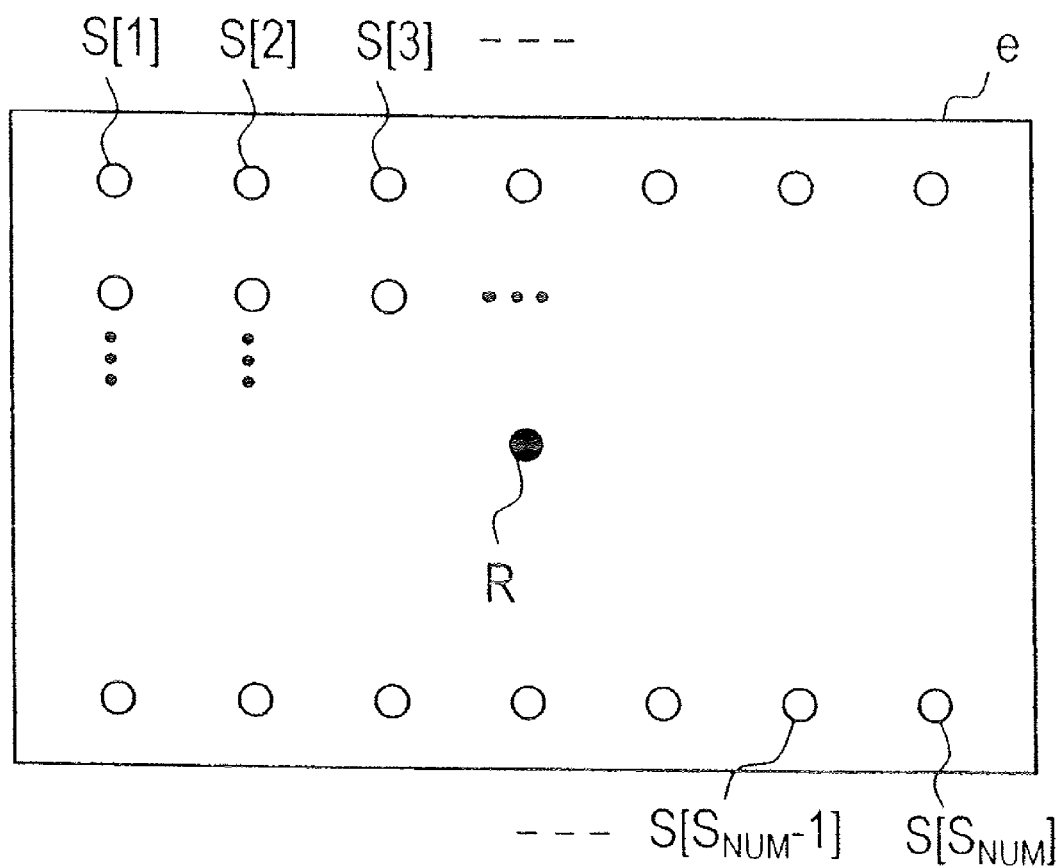
FIG. 28 is an enlarged view of one small region shown in FIG. 4 according to the embodiments of the invention, explaining the representative point matching method.

For the sake of clarification, the description of the representative point matching method will be continued, taking up a detection region $E_1$ as an example. The absolute value of the difference between the brightness value of each sampling point S within the small region "e" of the currently inputted image and the brightness value of the representative point R within the corresponding small region "e" of the reference image is obtained for all the small regions "e" of the detection region $E_1$. The absolute value obtained for a certain sampling point S corresponds to a correlation value of the sampling point S. Now, as shown in FIG. 27, suppose that the detection region $E_1$ is composed of a total of 48 small regions e[1], e[2], e[3], . . . , e[47], and e[48]. Here, let the number of sampling points S within one small region "e" be $S_{NUM}$. Then, as shown in FIG. 28, one small region "e" includes $S_{NUM}$ sampling points S[1], S[2], S[3], . . . , S[$S_{NUM}$−1], and S[$S_{NUM}$] The brightness value of the representative point R of a small region e[i] within the detection region $E_1$ of the reference image is represented by $Y_A[i, R]$, and the brightness value of a sampling point S[j] of a small region e[i] within the detection region $E_1$ of the currently inputted image is represented by $Y_B[i, S[j]]$. In the description of $Y_A[i, R]$, $Y_B[i, S[j]]$, and AC[j], which will be described later, i is any integer satisfying $1 \leq i \leq 48$ and j is any integer satisfying $1 \leq j \leq S_{NUM}$.

The representative point matching circuit 41 calculates a cumulative total of the correlation values of the sampling points S displaced from the representative point R by the same amount. Such calculation is performed for all the small regions "e" within the detection region $E_1$. Thus, in this example, a cumulative total of 48 correlation values is calculated. In other words, suppose that a coordinate system is set for each small region "e". Then, a cumulative total of correlation values of 48 pixels having the same coordinates in the small region coordinate system is calculated. The cumulative total thus obtained is referred to as a "cumulative total correlation value". The cumulative total correlation value is generally called a matching error. For the detection region $E_1$, $S_{NUM}$ cumulative total correlation values are calculated. Let the cumulative total correlation values of S[1], S[2], S[3], . . . , S[$S_{NUM}$−1], and S[$S_{NUM}$] be represented by AC[1], AC[2], AC[3], . . . , AC[$S_{NUM}$−1], and AC[$S_{NUM}$], respectively. Then, they are given by formula (A1) below.

$$AC[j] = \sum_{i=1}^{48} (Y_A[i, R] - Y_B[i, S[j]]) \quad (A1)$$

where j is any integer satisfying $1 \leq j \leq S_{NUM}$.

After $S_{NUM}$ cumulative total correlation values are obtained for the detection region $E_1$, the smallest cumulative total correlation value is identified. Then, the displacement between the sampling point S corresponding to the smallest cumulative total correlation value and the representative point R, that is, the displacement having the highest correlation is detected. In general, such displacement is extracted as a motion vector of the detection region $E_1$. However, the motion detection circuit 32 behaves differently (the details will be described later). The method for calculating a cumulative total correlation value has been described, taking up the detection region $E_1$ as an example. The same calculation method is adopted for the other detection regions $E_2$ to $E_9$. In this way, the cumulative total correlation values are calculated for each of the detection region $E_1$ to $E_9$. A cumulative total correlation value calculated for a certain detection region based on the representative point matching method represents the correlation (similarity) between an image of the detection region of the reference image and an image of the detection region of the currently inputted image when the currently inputted image is displaced from the reference image by a predetermined amount (when there is a relative positional difference between the reference image and the currently inputted image). The higher the correlation, the smaller the cumulative total correlation value.

With reference to FIG. 3, the operation of the representative point matching circuit 41 will be described more specifically. Image data transferred from the image memory 5 shown in FIG. 1 is sequentially inputted to the filter 51, and is individually fed to the representative point memory 52 and to the subtraction circuit 53 via the filter 51. The filter 51 is a low-pass filter, and is used for ensuring sufficiently high motion vector detection accuracy with a small number of representative points by improving the S/N ratio. The representative point memory 52 stores, for each small region "e" of the detection regions $E_1$ to $E_9$, positional data specifying the position of the representative point R on the image and brightness data specifying the brightness value of the representative point R.

The memory contents of the representative point memory 52 can be updated at any timing. The memory contents can be updated every time an image is inputted to the representative point memory 52. Alternatively, a reference image may be set so that the memory contents are updated only when the reference image is inputted. The brightness value of a certain pixel (a representative point R or a sampling point S) represents the brightness of the pixel. Here, it is assumed that the brightness of the pixel increases with an increase in the brightness value, and the brightness value is represented by an 8 bit digital value ranging from 0 to 255. Needless to say, the brightness value may be represented by any bit number other than 8 bits.

The subtraction circuit 53 performs subtraction between the brightness value of the representative point R of the reference image fed from the representative point memory 52 and the brightness value of each sampling point S of the currently inputted image, and outputs the absolute values of the subtraction results. The output values of the subtraction circuit 53 each represent the correlation value of the sampling point S, and are sequentially fed to the cumulative addition circuit 54. The cumulative addition circuit 54 performs cumulative addition of the correlation values outputted from the subtraction circuit 53 so as to obtain the above-described cumulative total correlation value, and then outputs it.

The calculation circuit 55 receives the cumulative total correlation values fed from the cumulative addition circuit 54, calculates data shown in FIG. 8, and outputs the data thus calculated. For a comparison between the reference image and the currently inputted image, the calculation circuit 55 receives, for each detection region, a plurality of cumulative total correlation values (hereinafter a "cumulative total correlation value group for calculation") corresponding to the number of sampling points S provided in one small region "e". For each detection region, the calculation circuit 55 calculates:

an average value Vave of all the cumulative total correlation values forming the cumulative total correlation value group for calculation;

the smallest cumulative total correlation value of all the cumulative total correlation values forming the cumulative total correlation value group for calculation;

a position $P_A$ of the pixel corresponding to the smallest cumulative total correlation value; and a cumulative total correlation value (hereinafter also referred to simply as a "neighborhood cumulative total correlation value") corresponding to a nearby pixel of the pixel at the position $P_A$.

For each small region "e", a pixel position or the like is defined as follows. In each small region "e", a pixel position of the representative point R is represented by (0, 0). The position $P_A$ is a pixel position of the sampling point S corresponding to the smallest cumulative total correlation value relative to the pixel position (0, 0) of the representative point R, and is represented by $(i_A, j_A)$ (see FIG. 6). The nearby pixels of the pixel at the position $P_A$ are pixels located near the pixel at the position $P_A$, including pixels adjacent to the pixel at the position $P_A$. In this embodiment, it is assumed that 24 nearby pixels are located around the pixel at the position $P_A$. As shown in FIG. 7, the pixel at the position $P_A$ and the 24 nearby pixels form a group of pixels arranged in a 5×5 matrix. A pixel position of each pixel of the pixel group is represented by $(i_A+p, j_A+q)$. At the center of the pixel group, the pixel at the position $P_A$ is located. Here, p and q are integers, and $-2 \leq p \leq 2$ and $-2 \leq q \leq 2$ hold. As p increases from −2 to 2, the pixel position moves downward with the position $P_A$ at the center; as q increases from −2 to 2, the pixel position moves rightward with the position $P_A$ at the center. The cumulative total correlation value corresponding to the pixel position $(i_A+p, j_A+q)$ is represented by $V(i_A+p, j_A+q)$.

In general, the motion vector is calculated on the assumption that the position $P_A$ of the smallest cumulative total correlation value corresponds to a true matching position. In this embodiment, however, the smallest cumulative total correlation value is regarded as a potential candidate for a cumulative total correlation value corresponding to a true matching position. The smallest cumulative total correlation value obtained at the position $P_A$ is represented by $V_A$, which will be referred to as a "potential smallest correlation value $V_A$". Thus, $V(i_A, j_A) = V_A$.

The other potential candidates are identified as follows. For each detection region, the calculation circuit 55 searches the cumulative total correlation value group for calculation for a cumulative total correlation value close to the smallest cumulative total correlation value $V_A$, and identifies the cumulative total correlation value thus found as a potential smallest correlation value. The cumulative total correlation value close to the smallest cumulative total correlation value $V_A$ is a cumulative total correlation value equal to or smaller than a value obtained by increasing $V_A$ according to a predetermined rule. An example of such a cumulative total correlation value is a cumulative total correlation value equal to or smaller than a value obtained by adding a predetermined threshold value (e.g., 2) to $V_A$, or a cumulative total correlation value equal to or smaller than a value obtained by multiplying $V_A$ by a coefficient greater than 1. Up to four potential smallest correlation values, for example, including the aforementioned potential smallest correlation value $V_A$ are identified.

For the sake of convenience, in the following description, suppose that potential smallest correlation values $V_B$, $V_C$, and $V_D$ other than the potential smallest correlation value $V_A$ are identified for each detection region. As described above, the other potential smallest correlation values are identified by searching for a cumulative total correlation value close to the smallest cumulative total correlation value $V_A$; however, any or all of $V_B$, $V_C$, and $V_D$ may be equal to $V_A$. In this case, the cumulative total correlation value group for calculation of a certain detection region includes two or more smallest cumulative total correlation values.

As is the case with the potential smallest correlation value $V_A$, for each detection region, the calculation circuit 55 detects:

a position $P_B$ of the pixel corresponding to the potential smallest correlation value $V_B$ and a total of 24 cumulative total correlation values (hereinafter also referred to as "neighborhood cumulative total correlation values") corresponding to 24 nearby pixels of the pixel at the position $P_B$;

a position $P_C$ of the pixel corresponding to the potential smallest correlation value $V_C$ and a total of 24 cumulative total correlation values (hereinafter also referred to as "neighborhood cumulative total correlation values") corresponding to 24 nearby pixels of the pixel at the position $P_C$; and a position $P_D$ of the pixel corresponding to the potential smallest correlation value $V_D$ and a total of 24 cumulative total correlation values (hereinafter also referred to as "neighborhood cumulative total correlation values") corresponding to 24 nearby pixels of the pixel at the position $P_D$ (see FIG. 8).

For each small region "e", as is the case with the position $P_A$, a pixel position or the like is defined as follows. The positions $P_B$, $P_C$, and $P_D$ are pixel positions of the sampling points S corresponding to the potential smallest correlation values $V_B$, $V_C$, and $V_D$, respectively, relative to the pixel position (0, 0) of the representative point R, and are represented by $(i_B, j_B)$, $(i_C, i_C)$, and $(i_D, j_D)$, respectively. The pixel at the position $P_B$ and the nearby pixels thereof form a group of pixels arranged in a 5×5 matrix, and a pixel position of each pixel of the pixel group is represented by $(i_B+p, j_B+q)$. Likewise, the pixel at the position $P_C$ and the nearby pixels thereof form a group of pixels arranged in a 5×5 matrix, and a pixel position of each pixel of the pixel group is represented by $(i_C+p, j_C+q)$; the pixel at the position $P_D$ and the nearby pixels thereof form a group of pixels arranged in a 5×5 matrix, and a pixel position of each pixel of the pixel group is represented by $(i_D+p, j_D+q)$. Here, as is the case with the position $P_A$, p and q are integers, and $-2 \leq p \leq 2$ and $-2 \leq q \leq 2$ hold. As p increases from −2 to 2, the pixel position moves downward with the position $P_B$ (or $P_C$ or $P_D$) at the center; as q increases from −2 to 2, the pixel position moves rightward with the position $P_B$ (or $P_C$ or $P_D$) at the center. The cumulative total correlation values corresponding to the pixel positions $(i_B+p, j_B+q)$, $(i_C+p, j_C+q)$, and $(i_D+p, i_D+q)$ are represented by $V(i_B+p, j_B+q)$, $V(i_C+p, j_C+q)$, and $V(i_D+p, j_D+q)$, respectively.

Furthermore, for each detection region, the calculation circuit 55 calculates the number Nf of potential smallest correlation values, and outputs it. In this example, for each detection region, Nf is 4. Hereinafter, for each detection region, data calculated and outputted by the calculation circuit 55 is called as follows. Data specifying the potential smallest correlation value $V_A$, the position $P_A$, and the neighborhood cumulative total correlation value $V(i_A+p, j_A+q)$ are collectively called "first block data". Data specifying the potential smallest correlation value $V_B$, the position $P_B$, and the neighborhood cumulative total correlation value $V(i_B+p$, $j_B+q$) are collectively called "second block data". Data specifying the potential smallest correlation value $V_C$, the position $P_C$, and the neighborhood cumulative total correlation value $V(i_C+p, j_C+q)$ are collectively called "third block data". Data specifying the potential smallest correlation value $V_D$, the position $P_D$, and the neighborhood cumulative total correlation value $V(i_D+p, j_D+q)$ are collectively called "fourth block data".

Procedures Performed by the Motion Detection Circuit

Figure 13:
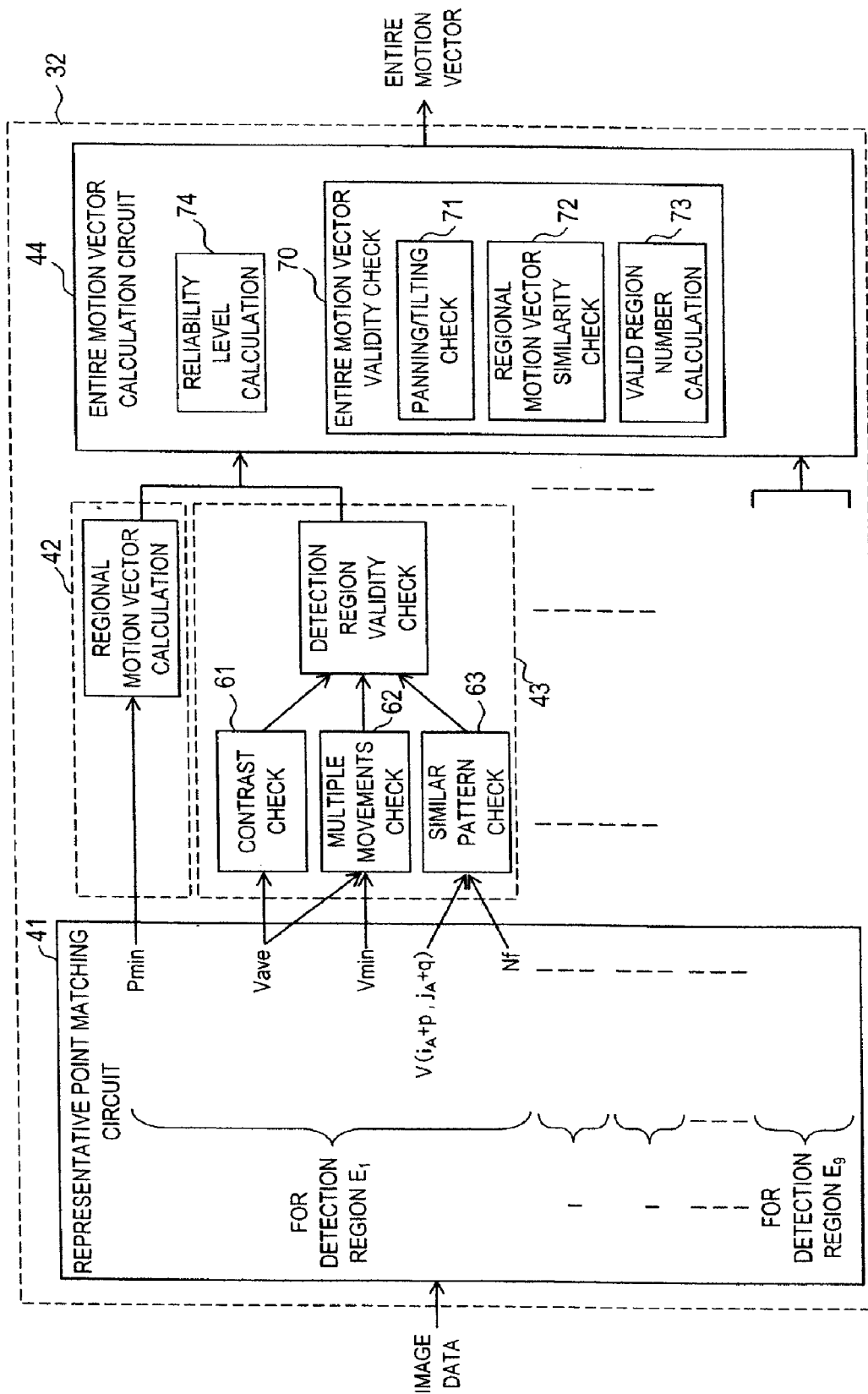
FIG. 13 is a detailed internal block diagram showing the motion detection circuit shown in FIG. 1.

Next, with reference to flow charts shown in FIGS. 9 and 10, the procedures performed by the motion detection circuit 32 will be described. FIG. 13 is a detailed internal block diagram of the motion detection circuit 32, showing the flow of different data within the motion detection circuit 32. As shown in FIG. 13, the detection region validity checking circuit 43 includes a contrast checking portion 61, a multiple movements checking portion 62, and a similar pattern checking portion 63, and the entire motion vector calculation circuit 44 includes an entire motion vector validity checking portion 70 and a reliability level calculating portion 74. The entire motion vector validity checking portion 70 includes a panning/tilting checking portion 71, a regional motion vector similarity checking portion 72, and a valid region number calculating portion 73.

An outline of the operation will be described. For each detection region, the motion detection circuit 32 identifies one of the potential smallest correlation values, the one corresponding to a true matching position, as an adopted smallest correlation value Vmin, and detects a displacement from the position of the representative point R to the position ($P_A$, $P_B$, $P_C$, or $P_D$) of the adopted smallest correlation value Vmin as a motion vector of the detection region (hereinafter a "regional motion vector"). Then, the motion detection circuit 32 outputs the average of the regional motion vectors thus detected as a motion vector of the entire image (hereinafter an "entire motion vector").

When an entire motion vector is calculated by averaging, the detection regions are individually checked whether they are valid or invalid, and a regional motion vector corresponding to an invalid detection region is discarded as invalid. Then, the average of the valid regional motion vectors is, in principle, calculated as an entire motion vector, and it is checked whether the entire motion vector thus calculated is valid or invalid. In the reliability level calculating portion 74 shown in FIG. 13, the level of reliability of the entire motion vector is also calculated. A method for calculating the level of reliability will be specifically described after the explanation of FIGS. 9 and 10.

Figure 9:
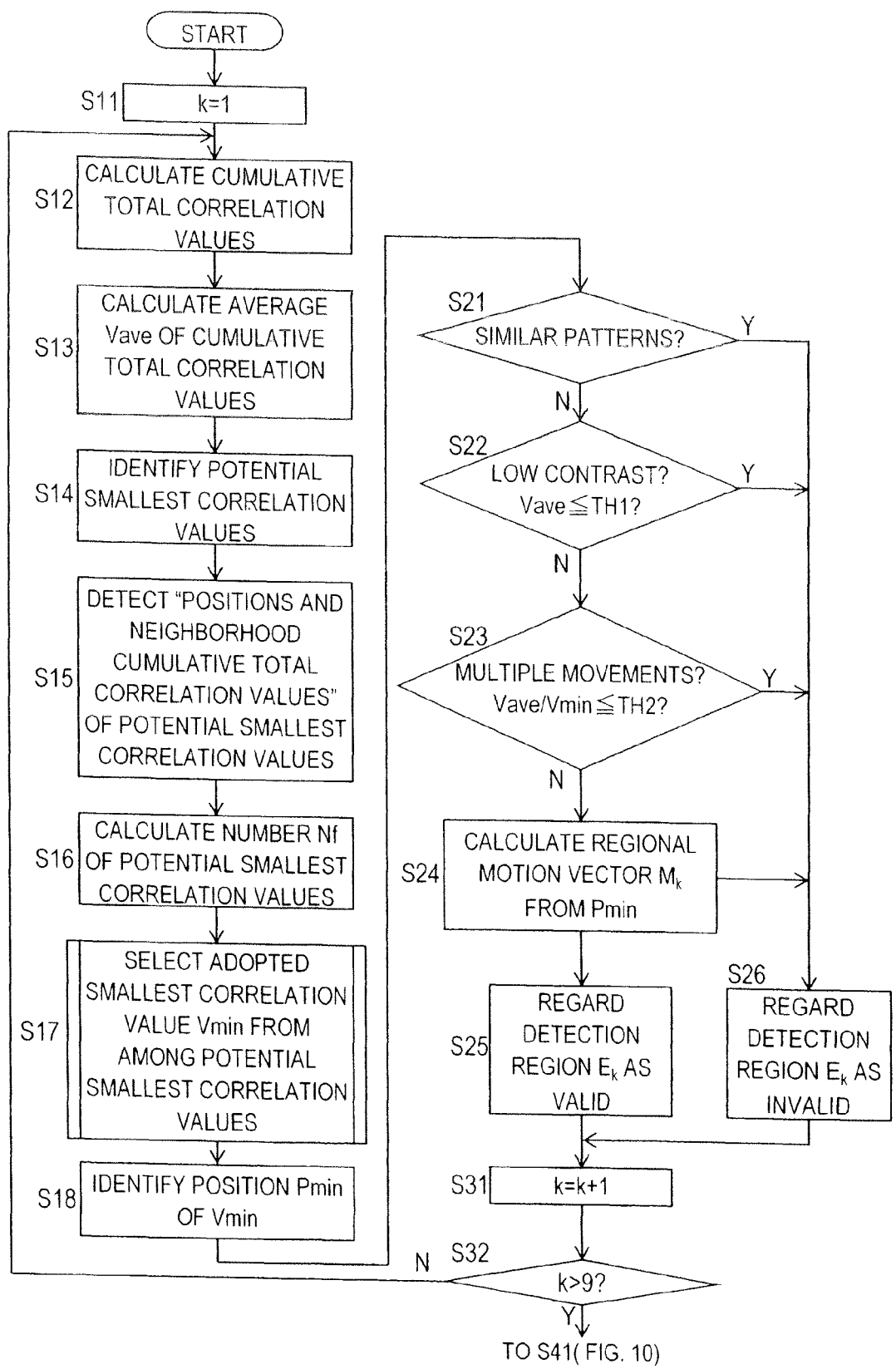
FIG. 9 is a flow chart showing operation procedures of the motion detection circuit shown in FIG. 1.

The processing from step S12 to S18 shown in FIG. 9 is performed by the representative point matching circuit 41 shown in FIG. 2. The processing in step S24 shown in FIG. 9 is performed by the regional motion vector calculation circuit 42 shown in FIG. 2. The processing from step S21 to S23 and the processing in steps S25 and S26 shown in FIG. 9 are performed by the detection region validity checking circuit 43 shown in FIG. 2. The processing from step S41 to S49 shown in FIG. 10 is performed by the entire motion vector calculation circuit 44 shown in FIG. 2.

Figure 10:
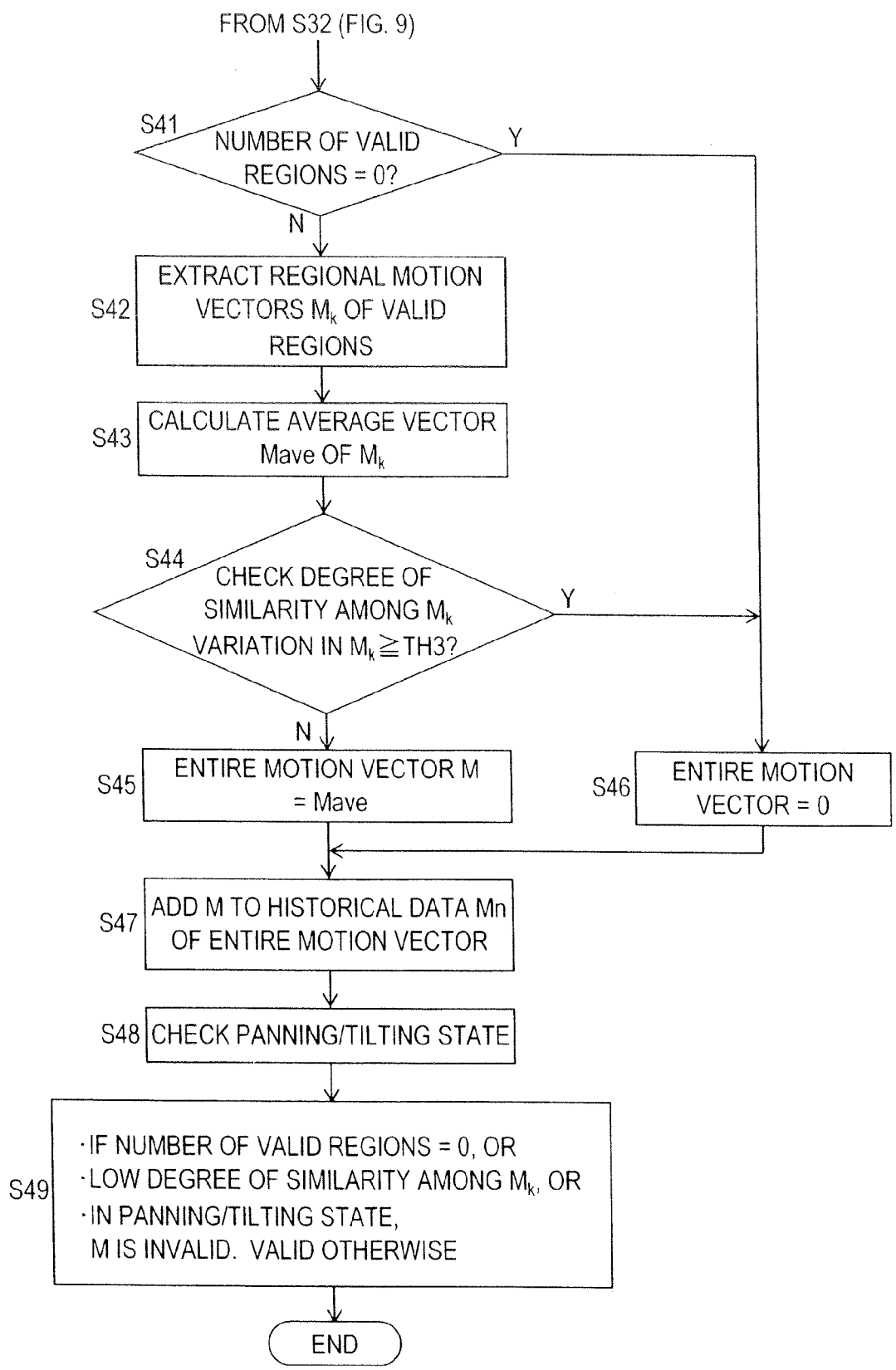
FIG. 10 is a flow chart showing operation procedures of the motion detection circuit shown in FIG. 1.

FIGS. 9 and 10 show the procedures performed for a given reference image and a given non-reference image (for example, a currently inputted image). When the shutter button 21 is depressed in the image stabilization shooting mode, the motion detection circuit 32 performs the processing in steps of FIGS. 9 and 10 by using the first divided exposure image as a reference image and each of the divided exposure images that follow as a non-reference image (alternatively, it is also possible to use any one of the divided exposure images inputted after the first divided exposure image as a reference image). In the image stabilization shooting mode, irrespective of whether the shutter button 21 is depressed or not, the processing in steps of FIGS. 9 and 10 is performed by using the last image (image data) inputted to the motion detection circuit 32 as a reference image and a currently inputted image as a non-reference image.

First, in step S11, a variable k for specifying which one of the nine detection regions $E_1$ to $E_9$ is to be processed is set to 1. When k=1, 2, ... 9, the detection regions $E_1$, $E_2$, ... $E_9$ are respectively processed.

After step S11, in step S12, cumulative total correlation values of a detection region $E_k$ are calculated. In step S13, an average value Vave of the cumulative total correlation values of the detection region $E_k$ is calculated. Then, potential smallest correlation values are identified as potential candidates for a cumulative total correlation value corresponding to a true matching position (step S14). Suppose that, as in the example described above, four potential smallest correlation value $V_A$, $V_B$, $V_C$, and $V_D$ are identified as potential smallest correlation values. In the following step S15, the positions and neighborhood cumulative total correlation values of the potential smallest correlation values identified in step S14 are detected. In step S16, the number Nf of potential smallest correlation values that are identified in step S14 is calculated. As a result of the processing from step S11 to S16, the average value Vave, the first to fourth block data, and the number Nf, which are shown in FIG. 8, of the detection region $E_k$ are calculated.

After step S16, in step S17, one of the potential smallest correlation values of the detection region $E_k$, the one corresponding to the true matching position, is selected as the adopted smallest correlation value Vmin.

The processing in step S17 will be described in detail with reference to FIGS. 11A to 11E and FIG. 12. In FIGS. 11A to 11E, pixels corresponding to the cumulative total correlation values used for the processing in step S17 are represented by the diagonally shaded area. FIG. 12 is a flow chart specifically explaining the processing in step S17. The processing in step S17 is composed of steps S101 to S112.

Figure 11A:
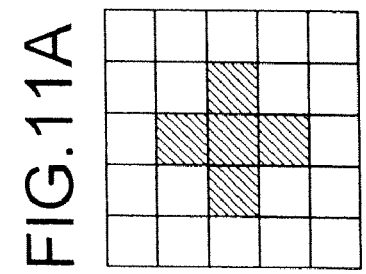
FIGS. 11A to 11E are diagrams each showing a pattern of cumulative total correlation values used for selection of an adopted smallest correlation value in step S17 of FIG. 9.
Figure 12:
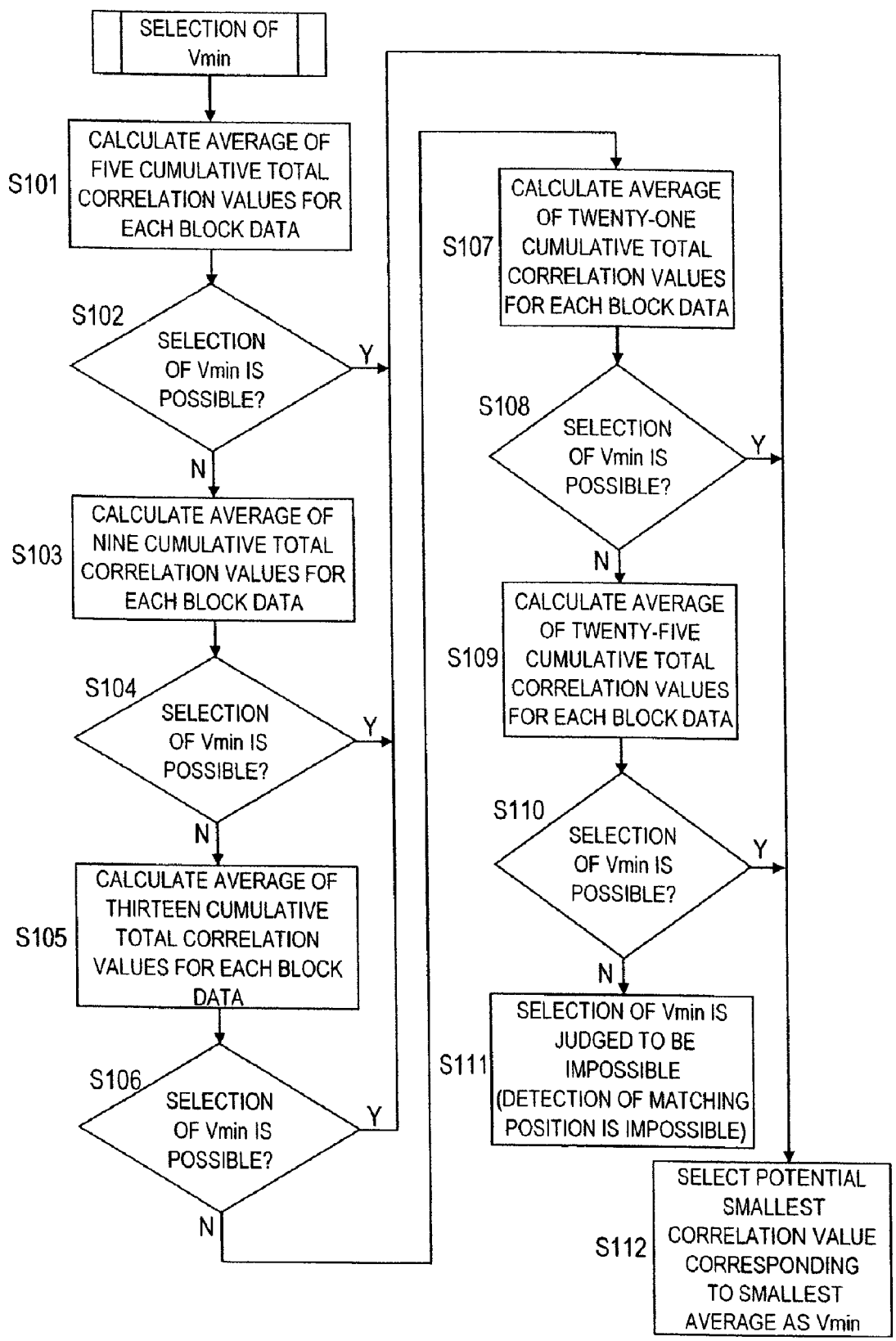
FIG. 12 is a flow chart specifically showing how to select an adopted smallest correlation value in step S17 of FIG. 9.

When the procedure proceeds to step S17, in step S101 of FIG. 12, the average value (evaluation value for selection) of the potential smallest correlation value and four neighborhood cumulative total correlation values that form the pattern shown in FIG. 11A is calculated for each of the first to fourth block data (that is, for each potential smallest correlation value). That is, when (p, q)=(0, −1), (−1, 0), (0, 1), (1, 0), and (0, 0), the average value $V_{A\_}$ave of the cumulative total correlation values $V(i_A+p, j_A+q)$, the average value $V_{B\_}$ave of the cumulative total correlation values $V(i_B+p, j_B+q)$, the average value $V_{C\_}$ave of the cumulative total correlation values $V(i_C+p, j_C+q)$, and the average value $V_{D\_}$ave of the cumulative total correlation values $V(i_D+p, j_D+q)$ are calculated.

In step S102, based on the average values calculated in step S101, it is checked whether an adopted smallest correlation value Vmin can be selected or not. Specifically, if all the differences between the smallest average value of the four average values calculated in step S101 and the other average values are equal to or smaller than a predetermined difference threshold value (e.g., 2), it is judged that the selection is impossible (the selection is unreliable), and the procedure proceeds to step S103. If not, the procedure proceeds to step S112, and the potential smallest correlation value corresponding to the smallest average value of the four average values calculated in step S101 is selected as the adopted smallest correlation value Vmin. For example, when $V_{A\_}ave < V_{B\_}ave < V_{C\_}ave < V_{D\_}ave$ holds, the potential smallest correlation value $V_A$ is selected as the adopted smallest correlation value Vmin.

Thereafter, processing similar to that in steps S101 and S102 is performed for different numbers of cumulative total correlation values at different positions for selecting the adopted smallest correlation value Vmin.

Figure 11B:
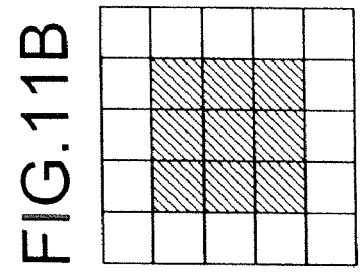

That is, in step S103, the average value of the potential smallest correlation value and eight neighborhood cumulative total correlation values that form the pattern shown in FIG. 11B is calculated for each of the first to fourth block data (that is, for each potential smallest correlation value). That is, when (p, q)=(-1, -1), (-1, 0), (-1, 1), (0, -1), (0, 0), (0, 1), (1, -1), (1, 0), and (1, 1), the average value $V_{A\_}ave$ of the cumulative total correlation values $V(i_A+p, j_A+q)$, the average value $V_{B\_}ave$ of the cumulative total correlation values $V(i_B+p, j_B+q)$, the average value $V_{C\_}ave$ of the cumulative total correlation values $V(i_C+p, j_C+q)$, and the average value $V_{D\_}ave$ of the cumulative total correlation values $V(i_D+p, j_D+q)$ are calculated.

In step S104, based on the average values calculated in step S103, it is checked whether an adopted smallest correlation value Vmin can be selected or not. Specifically, if all the differences between the smallest average value of the four average values calculated in step S103 and the other average values are equal to or smaller than a predetermined difference threshold value (e.g., 2), it is judged that the selection is impossible (the selection is unreliable), and the procedure proceeds to step S105. If not, the procedure proceeds to step S112, and the potential smallest correlation value corresponding to the smallest average value of the four average values calculated in step S103 is selected as the adopted smallest correlation value Vmin.

Figure 11C:
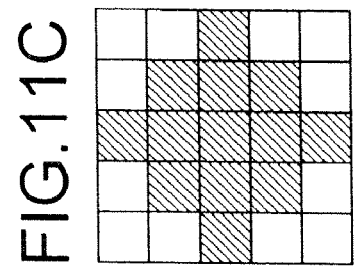

In step S105, the average value of the potential smallest correlation value and twelve neighborhood cumulative total correlation values that form the pattern shown in FIG. 11C is calculated for each of the first to fourth block data (that is, for each potential smallest correlation value). That is, when (p, q)=(-1, -1), (-1, 0), (-1, 1), (0, -1), (0, 0), (0, 1), (1, -1), (1, 0), (1, 1), (-2, 0), (2, 0), (0, 2), and (0, -2), the average value $V_{A\_}ave$ of the cumulative total correlation values $V(i_A+p, j_A+q)$, the average value $V_{B\_}ave$ of the cumulative total correlation values $V(i_B+p, j_B+q)$, the average value $V_{C\_}ave$ of the cumulative total correlation values $V(i_C+p, j_C+q)$, and the average value $V_D$ ave of the cumulative total correlation values $V(i_D+p, j_D+q)$ are calculated.

In step S106, based on the average values calculated in step S105, it is checked whether an adopted smallest correlation value Vmin can be selected or not. Specifically, if all the differences between the smallest average value of the four average values calculated in step S105 and the other average values are equal to or smaller than a predetermined difference threshold value (e.g., 2), it is judged that the selection is impossible (the selection is unreliable), and the procedure proceeds to step S107. If not, the procedure proceeds to step S112, and the potential smallest correlation value corresponding to the smallest average value of the four average values calculated in step S105 is selected as the adopted smallest correlation value Vmin.

Figure 11D:
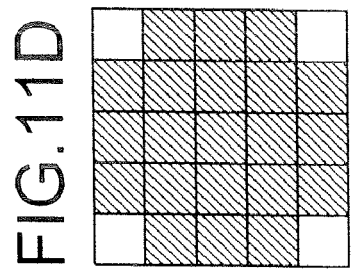

In step S107, the average value of the potential smallest correlation value and twenty neighborhood cumulative total correlation values that form the pattern shown in FIG. 11D is calculated for each of the first to fourth block data (that is, for each potential smallest correlation value). That is, when (p, q)=(-2, -1), (-2, 0), (-2, 1), (-1, -2), (-1, -1), (-1, 0), (-1, 1), (-1, 2), (0, -2), (0, -1), (0, 0), (0, 1), (0, 2), (1, -2), (1, -1), (1, 0), (1, 1), (1, 2), (2, -1), (2, 0), and (2, 1), the average value $V_{A\_}ave$ of the cumulative total correlation values $V(i_A+p, j_A+q)$, the average value $V_{B\_}ave$ of the cumulative total correlation values $V(i_B+p, j_B+q)$, the average value $V_{C\_}ave$ of the cumulative total correlation values $V(i_C+p, j_C+q)$, and the average value $V_{D\_}ave$ of the cumulative total correlation values $V(i_D+p, j_D+q)$ are calculated.

In step S108, based on the average values calculated in step S107, it is checked whether an adopted smallest correlation value Vmin can be selected or not. Specifically, if all the differences between the smallest average value of the four average values calculated in step S107 and the other average values are equal to or smaller than a predetermined difference threshold value (e.g., 2), it is judged that the selection is impossible (the selection is unreliable), and the procedure proceeds to step S109. If not, the procedure proceeds to step S112, and the potential smallest correlation value corresponding to the smallest average value of the four average values calculated in step S107 is selected as the adopted smallest correlation value Vmin.

Figure 11E:
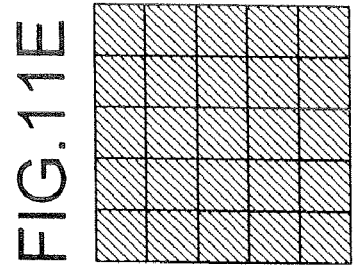

In step S109, the average value of the potential smallest correlation value and twenty-four neighborhood cumulative total correlation values that form the pattern shown in FIG. 11E is calculated for each of the first to fourth block data (that is, for each potential smallest correlation value). That is, when (p, q)=(-2, -2), (-2, -1), (-2, 0), (-2, 1), (-2, 2), (-1, -2), (-1, -1), (-1, 0), (-1, 1), (-1, 2), (0, -2), (0, -1), (0, 0), (0, 1), (0, 2), (1, -2), (1, -1), (1, 0), (1, 1), (1, 2), (2, -2), (2, -1), (2, 0), (2, 1), and (2, 2), the average value $V_{A\_}ave$ of the cumulative total correlation values $V(i_A+p, j_A+q)$, the average value $V_{B\_}ave$ of the cumulative total correlation values $V(i_B+p, j_B+q)$, the average value $V_{C\_}ave$ of the cumulative total correlation values $V(i_C+p, j_C+q)$, and the average value $V_{D\_}ave$ of the cumulative total correlation values $V(i_D+p, j_D+q)$ are calculated.

In step S110, based on the average values calculated in step S109, it is checked whether an adopted smallest correlation value Vmin can be selected or not. Specifically, if all the differences between the smallest average value of the four average values calculated in step S109 and the other average values are equal to or smaller than a predetermined difference threshold value (e.g., 2), it is judged that the selection is impossible (the selection is unreliable), and the procedure proceeds to step S11. If not, the procedure proceeds to step S112, and the potential smallest correlation value corresponding to the smallest average value of the four average values calculated in step S109 is selected as the adopted smallest correlation value Vmin.

If the procedure proceeds to step S111, it is finally judged that an adopted smallest correlation value Vmin cannot be selected. That is, it is judged that a matching position cannot be detected. The description heretofore deals with the procedures performed for a plurality of potential smallest correlation values. In a case where there is only one potential smallest correlation value, it is automatically used as an adopted smallest correlation value Vmin.

When an adopted smallest correlation value Vmin is selected in step S17, in step S18, a position Pmin of a pixel corresponding to the adopted smallest correlation value Vmin is identified. For example, if the potential smallest correlation value $V_A$ is selected as the smallest correlation value Vmin, the position $P_A$ serves as the position Pmin. Vmin.

When the adopted smallest correlation value Vmin and the position Pmin are identified in steps S17 and S18, the procedure proceeds to step S21. In steps S21 to S26, it is checked whether the detection region $E_k$ is valid or invalid, and a regional motion vector $M_k$ of the detection region $E_k$ is calculated. The processing in each step will be described in detail.

In step S21, the similar pattern checking portion 63 (see FIG. 13) checks whether or not there are similar patterns in the detection region $E_k$. If similar patterns are found to be exist, the level of reliability of the regional motion vector calculated for the detection region $E_k$ is low (that is, the regional motion vector $M_k$ does not reflect the movement of an image in the detection region $E_k$ with high accuracy). Thus, in this case, the detection region $E_k$ is regarded as invalid (step S26). Step S21 is performed based on the processing results obtained in step S17. That is, if the procedure reaches step S112 of FIG. 12 and an adopted smallest correlation value Vmin is selected, it is judged that there is no similar pattern, and the procedure proceeds from step S21 to step S22. On the other hand, if the procedure reaches step S111 of FIG. 12 and no adopted smallest correlation value Vmin is selected, it is judged that there are similar patterns. In this case, the procedure proceeds from step S21 to step S26, and the detection region $E_k$ is regarded as invalid.

In step S22, the contrast checking portion 61 (see FIG. 13) checks whether the contrast of an image in the detection region $E_k$ is low or not. If the contrast is found to be low, it is difficult to detect an accurate regional motion vector. Thus, the detection region $E_k$ is regarded as invalid. Specifically, it is checked whether or not the average value Vave of the cumulative total correlation values is equal to or smaller than a predetermined threshold TH1. If an inequality Vave≦TH1 holds, it is judged that the contrast is low. As a result, the procedure proceeds to step S26, and the detection region $E_k$ is regarded as invalid. Such judgment is performed based on the following principle. When the contrast of an image is low (for example, when the entire image is white), the difference in brightness is small. This makes the cumulative total correlation values small as a whole. On the other hand, if the inequality Vave≦TH1 does not hold, it is judged that the contrast is not low. As a result, the procedure proceeds to step S23. The threshold TH1 is set to an appropriate value obtained by the experiment.

In step S23, the multiple movements checking portion 62 (see FIG. 13) checks whether or not there are multiple movements in the detection region $E_k$. If there exists, for example, a moving object having nothing to do with camera shake in the detection region $E_k$, it is judged that there are multiple movements in the detection region $E_k$. Since the multiple movements in the detection region $E_k$ make it difficult to detect an accurate regional motion vector, the detection region $E_k$ is regarded as invalid. Specifically, it is checked whether or not an inequality Vave/Vmin≦TH2 holds. If the inequality is found to hold, it is judged that there are multiple movements, the procedure proceeds to step S26, and the detection region $E_k$ is regarded as invalid. Such judgment is performed based on the following principle. If there are multiple movements, there is no exact matching point. This increases the smallest cumulative total correlation value. Furthermore, the average value Vave is divided by Vmin so as to prevent the judgment from depending on the contrast of the subject. On the other hand, if the inequality Vave/Vmin≦TH2 does not hold, it is judged that there are no multiple movements, and the procedure proceeds to step S24. The threshold TH2 is set to an appropriate value obtained by the experiment.

In step S24, the regional motion vector calculation circuit 42 shown in FIG. 2 (FIG. 13) calculates the regional motion vector $M_k$ based on the position Pmin representing the true matching position. For example, if the position $P_A$ is the position Pmin, the regional motion vector $M_k$ is calculated based on the positional information specifying the position $P_A$ on the image (the information specifying the pixel position $(i_A, j_A)$). More specifically, in a given small region "e" of the detection region $E_k$, the direction and magnitude of the displacement from the position of the representative point R to the position Pmin ($P_A$, $P_B$, $P_C$, or $P_D$) representing the adopted smallest correlation value Vmin correspond to the direction and magnitude of the regional motion vector $M_k$.

After step S24, in step S25, the detection region $E_k$ is regarded as valid, and the procedure proceeds to step S31. On the other hand, as described above, in step S26 to which the procedure proceeds from step S21 or the like, the detection region $E_k$ is regarded as invalid, and the procedure proceeds to step S31. In step S31, the variable k is incremented by 1. In the following step S32, it is judged whether or not the variable k is greater than 9. If k>9 does not hold, the procedure goes back to step S12, and the processing in step S12 and in subsequent steps is performed again for another detection region. If k>9 holds, the processing in step S12 and in subsequent steps has been performed for all the detection regions $E_1$ to $E_9$. Therefore, the procedure proceeds to step S41 of FIG. 10.

In steps S41 to S49 of FIG. 10, an entire motion vector M is calculated based on the regional motion vector $M_k$ ($1 \leq k \leq 9$), and the validity of the entire motion vector M thus calculated is checked.

In step S41, based on the processing results obtained in steps S25 and S26 of FIG. 9, it is checked whether the number of valid detection regions (hereinafter "valid regions") is zero or not. If there are one or more valid regions, the procedure proceeds to step S42, and the regional motion vectors $M_k$ of the one or more valid regions are extracted. In step S43, averaging of the regional motion vectors $M_k$ of the valid regions is performed to obtain the average vector Mave.

After step S43, in step S44, the regional motion vector similarity checking portion 72 (see FIG. 13) checks the degree of similarity among the regional motion vectors $M_k$ of the valid regions. In other words, by calculating a variation A in the regional motion vectors $M_k$ of the valid regions, it is checked whether there is an object that moves differently from one valid region from another. Specifically, the variation A is calculated according to formula (1) below.

$$A = [\text{Sum of } \{|M_k - \text{Mave}|/(\text{Norm of Mave})\}]/(\text{Number of valid regions}) \quad (1)$$

Then, it is checked whether the variation A is equal to or greater than a threshold TH3. If the variation A is found to be smaller than the threshold TH3, the procedure proceeds to step S45, where the average vector Mave calculated in step S43 is assigned to a motion vector of the entire image (an entire motion vector) M. Then, the procedure proceeds to step S47.

Note that [Sum of $\{|M_k-\text{Mave}|/(\text{Norm of Mave})\}$] in formula (1) corresponds to the sum of values of $\{|M_k-\text{Mave}|/(\text{Norm of Mave})\}$ individually calculated for each valid region. Incidentally, the valid region number calculating portion 73 shown in FIG. 13 calculates the number of valid regions.

If the variation A is found to be equal to or greater than the threshold TH3, the degree of similarity among the regional motion vectors $M_k$ of the valid regions is low. Therefore, the level of reliability of the entire motion vector to be calculated based on these regional motion vectors $M_k$ is considered to be low. For this reason, if the variation A is found to be equal to or greater than the threshold TH3 (N in step S44), the procedure proceeds to step S46, where 0 is assigned to the magnitude of the entire motion vector M. Then, the procedure proceeds to step S47. Also, in a case where the number of valid regions is found to be zero in step S41, 0 is assigned to the magnitude of the entire motion vector M in step S46, and the procedure proceeds to step S47.

In step S47, the entire motion vector M just obtained is added to the historical data Mn of the entire motion vector. As mentioned earlier, in the image stabilization shooting mode, the processing in steps of FIGS. 9 and 10 is performed irrespective of whether the shutter button 21 is depressed or not, so that the entire motion vectors M obtained in step S45 or S46 are sequentially added to the historical data Mn of the entire motion vector. Incidentally, one depression of the shutter button 21 results in a plurality of divided exposure images and a plurality of entire motion vectors M. For convenience of checking panning/tilting, which will be described below, it is assumed that only one of the plurality of entire motion vectors M is added to the historical data Mn (however, it is also possible to add all of the plurality of motion vectors M to the historical data Mn).

After step S47, in step S48, the panning/tilting checking portion 71 (see FIG. 13) checks whether or not the imaging apparatus is in a panning/tilting state based on the historical data Mn. In the panning/tilting state, the imaging apparatus is panning or tilting. When the imaging apparatus is panning, the casing (not shown) of the imaging apparatus is moved horizontally; when the imaging apparatus is tilting, the casing thereof is moved vertically. Used as a method for checking whether the imaging apparatus is panning or tilting is, for example, a method disclosed in JP-A-2006-074693 or a method disclosed in Japanese Patent Application No. 2006-091285, which the applicant of the present invention once filed.

For example, when the following first or second condition is satisfied, it is judged that the imaging apparatus is shifted from the camera shake state to the panning/tilting state (the camera shake state is not included in the panning/tilting state). The first condition is that the entire motion vectors M pointing in the same direction (the vertical direction or the horizontal direction) are obtained consecutively more than a predetermined number of times.

The second condition is that the integral of the magnitudes of the consecutively obtained entire motion vectors M pointing in the same direction is equal to or greater than a given proportion of the angle of view of the imaging apparatus.

For example, when the following third or fourth condition is satisfied, it is judged that the imaging apparatus is shifted from the panning/tilting state to the camera shake state.

The third condition is that the entire motion vectors whose magnitudes are equal to or smaller than 0.5 pixel are obtained consecutively more than a predetermined number of times (e.g., 10).

The fourth condition is that the entire motion vectors M pointing in the direction opposite to the direction of the entire motion vector M obtained when the imaging apparatus is shifted from the camera shake state to the panning/tilting state are obtained consecutively more than a predetermined number of times (e.g., 10).

Whether the first, second, third, or fourth condition is satisfied or not is determined based on the entire motion vector M just obtained and added to the historical data Mn and those already obtained and stored therein. The result of checking of the panning/tilting state is transmitted to the microcomputer 10 shown in FIG. 1.

After the checking processing in step S48 is completed, the procedure proceeds to step S49. In step S49, based on the processing results of steps S41 to S48, the entire motion vector validity checking portion 70 (see FIG. 13) checks the validity of the entire motion vector M just obtained.

Specifically, if the procedure proceeds to step S46 after the number of valid regions is found to be zero in step S41, if the procedure proceeds to step S46 after the degree of similarity among the regional motion vectors $M_k$ of the valid regions is found to be low in step S44, or if the imaging apparatus is found to be in the panning/tilting state in step S48, the entire motion vector M just obtained is regarded as invalid. If not, the entire motion vector M just obtained is regarded as valid.

When panning or tilting operation is performed, the amount of camera shake is so large that the displacement between the images to be compared exceeds the motion detection range commensurate with the size of the small region "e". This makes it impossible to detect an accurate motion vector. It is for this reason that, when the imaging apparatus is found to be in the panning/tilting state, the entire motion vector M is regarded as invalid.

The entire motion vector M thus obtained and the information for specifying whether the entire motion vector M is valid or invalid are fed to the coordinate transformation circuit 33 shown in FIG. 1.

In the image stabilization shooting mode, when the shutter button 21 is depressed, the processing in steps of FIGS. 9 and 10 is repeatedly performed. As a result, the entire motion vectors M of the divided exposure images are detected, and the entire motion vectors M thus detected are individually checked whether they are valid or invalid. According to the checking results thus obtained, the divided exposure images are combined together one on top of another as described above.

At this point, as mentioned earlier, the divided exposure images are combined together one on top of another in proportions (mixture proportions) based on the level of reliability of each entire motion vector M. The level of reliability of the entire motion vector M is calculated by the reliability level calculating portion 74 shown in FIG. 13.

Method for Calculating Reliability Level (Mixture Proportion)

Hereinafter, a method for calculating the reliability level will be described in detail. Now, for the sake of concreteness, suppose that the exposure division number N is 4. Then, in response to the depression of the shutter button 21, first, second, third, and fourth divided exposure images (hereinafter also referred to simply as "first, second, third, and fourth images") are obtained. FIG. 14 shows a table of different values used for calculation of the reliability level.

As described earlier, in this embodiment, the first image is treated as a reference image. If i is 2, 3, or 4, then, between the reference image (the first image) and the i-th image, the average value of the adopted smallest correlation values Vmin of up to nine valid regions is Vmin[i], the average value of the average values Vave of up to nine valid regions is Vave[i], the average value of the numbers Nf of potential smallest correlation values of up to nine valid regions is Nf[i], and the number of valid regions is Nval[i].

For example, consider a comparison between the first image and the second image. If it is judged, in steps S25 and S26 of FIG. 9, that only the detection regions $E_2$ and $E_7$ are valid, Vmin[2] for the second image is the average value of the adopted smallest correlation value Vmin of the detection region $E_2$ and the adopted smallest correlation value Vmin of the detection region $E_7$, Vave[2] for the second image is the average value of the average value Vave of the cumulative total correlation values of the detection region $E_2$ and the average value Vave of the cumulative total correlation values of the detection region $E_7$, Nf[2] for the second image is the average value of the number Nf of potential smallest correlation values of the detection region $E_2$ and the number Nf of potential smallest correlation values of the detection region $E_7$, and Nval[2] for the second image is the number of detection regions found to be valid, i.e., 2.

Since the first image is a reference image, unlike the second image and the like, it is impossible to determine the values, such as Vmin[i], for the first image. Therefore, the values Vmin[1], Vave[1], Nf[1], and Nval[1] for the first image are determined as shown in FIG. 14. That is, the smallest value of Vmin[2], Vmin[3], and Vmin[4] is regarded as Vmin[1], the largest value of Vave[2], Vave[3], and Vave[4] is regarded as Vave[1], the smallest value of Nf[2], Nf[3], and Nf[4] is regarded as Nf[1], and the largest value of Nval[2], Nval[3], and Nval[4] is regarded as Nval[1].

By calculating the different values defined as described above, the reliability level calculating portion 74 calculates the level of reliability of the entire motion vector M of each image. Let the level of reliability of the entire motion vector M of the i-th image be expressed as B[i]. Then, the level of reliability is calculated such that 0<B[i]<1 holds. Since the first image is a reference image, there is no entire motion vector M of the first image. However, the level of reliability B[1] of the first image is also calculated by referring to the values such as Vmin[1] determined as described above (a formula for calculation thereof will be described later).

As will be clear from the description below, the level of reliability B[i] is used as the mixture proportion of the i-th image to the composite image when the first to fourth images are combined together to form the composite image (one still image). The higher the level of reliability B[i], the higher the rate of contribution of the pixel value of the i-th image to the composite image. Thus, the level of reliability B[i] translates into the mixture proportion of the i-th image to the composite image when the first to fourth images are combined (added) together to form the composite image, or the rate of contribution of the pixel value of the i-th image to the composite image.

The level of reliability B[i] is calculated based on the following evaluation values: an evaluation value $B_{Vmin[i]}$ based on Vmin[i] that depends on the smallest cumulative total correlation value or the cumulative total correlation value close to the smallest cumulative total correlation value; an evaluation value $B_{Vave[i]}$ based on Vave[i] that depends on the average value of the cumulative total correlation values; an evaluation value $B_{Nf[i]}$ based on Nf[i] that depends on the number of smallest cumulative total correlation values or the number of cumulative total correlation values close to the smallest cumulative total correlation value; and an evaluation value $B_{Nval[i]}$ based on Nval[i] that depends on the number of valid regions.

Specifically, the evaluation values are multiplied by weighting coefficients and are then added together to obtain the level of reliability B[i]. That is, the level of reliability B[i] is given by formula (2) below. In formula (2) and the formulae presented in the course of the following description, i is an integer between 1 to 4 inclusive. Since the level of reliability B[i] is used as the mixture proportion of the i-th image to the composite image when the first to fourth images are combined together to form the composite image, the greater the evaluation values, the higher the rate of contribution of the pixel value of the i-th image to the composite image.

$$B[i] = W_{Vmin} \times B_{Vmin[i]} + W_{Vave} \times B_{Vave[i]} + W_{Nf} \times B_{Nf[i]} + W_{Nval} \times B_{Nval[i]} \quad (2)$$

Here, $W_{Vmin}$, $W_{Vave}$, $W_{Nf}$, and $W_{Nval}$ are weighting coefficients. The weighting coefficients are set to appropriate values (the values between or equal to 0 and 1) obtained by the experiment. As shown in formula (3) below, the sum of the weighting coefficients is 1. In this embodiment, for example, $W_{Vmin}$, $W_{Vave}$, $W_{Nf}$, and $W_{Nval}$ are 0.4, 0.2, 0.1, and 0.3, respectively.

$$W_{Vmin} + W_{Vave} + W_{Nf} + W_{Nval} = 1 \quad (3)$$

How to calculate each evaluation value will be described. Firstly, how to calculate the evaluation value $B_{Vmin[i]}$ will be described. The higher the degree of similarity between the i-th image and the reference image, the higher the level of reliability of the entire motion vector M calculated for the i-th image (the higher the probability of detecting an accurate motion vector). On the other hand, the higher the degree of similarity of the i-th image to the reference image, the smaller the value Vmin[i]. Therefore, the evaluation value $B_{Vmin[i]}$ is calculated based on the value Vmin[i] indicating the degree of similarity to the reference image. Specifically, the evaluation value $B_{Vmin}$[i] is calculated according to formula (4) below. According to this formula, the smaller Vmin[i] an image has due to its high degree of similarity to the reference image, the greater the evaluation value $B_{Vmin[i]}$. This makes larger the mixture proportion of the image to the composite image.

$$B_{V\min[i]} = \frac{\frac{1}{V\min[i]}}{\sum_{i=1}^{4}\left(\frac{1}{V\min[i]}\right)} \quad (4)$$

Secondly, how to calculate the evaluation value $B_{Vave[i]}$ will be described. The shaper the edge (or contrast) of an image is, the less the image suffers from blur resulting from camera shake, moving subject, defocusing, or the like. This increases the probability of detecting an accurate entire motion vector M. On the other hand, the higher the edge strength of the i-th image, the greater the value Vave[i]. Therefore, the evaluation value $B_{Vave[i]}$ is calculated based on the value Vave[i] indicating the edge strength of the image. Specifically, the evaluation value $B_{Vave[i]}$ is calculated according to formula (5) below. According to this formula, the greater Vave[i] an image has due to its high edge strength, the greater the evaluation value $B_{Vave[i]}$. This makes larger the mixture proportion of the image to the composite image.

$$B_{Vave[i]} = \frac{Vave[i]}{\sum_{i=1}^{4}(Vave[i])} \quad (5)$$

Thirdly, how to calculate the evaluation value $B_{Nf[i]}$ will be described. The fewer similar patterns are observed between the images to be compared, the higher the level of reliability of the entire motion vector M (the higher the probability of detecting an accurate motion vector). On the other hand, the more similar patterns are observed, the value Nf[i] tends to increase. Therefore, the evaluation value $B_{Nf[i]}$ is calculated based on the value Nf[i] indicating the presence of the similar pattern. Specifically, the evaluation value $B_{Nf[i]}$ is calculated according to formula (6) below. According to this formula, the smaller Nf[i] an image has due to fewer similar patterns, the greater the evaluation value $B_{Nf[i]}$. This makes larger the mixture proportion of the image to the composite image.

$$B_{Nf[i]} = \frac{\frac{1}{Nf[i]}}{\sum_{i=1}^{4}\left(\frac{1}{Nf[i]}\right)} \qquad (6)$$

Lastly, how to calculate the evaluation value $B_{Nval[i]}$ will be described. The more the valid regions (the valid detection regions), the higher the probability of detecting an accurate entire motion vector M. Therefore, the evaluation value $B_{Nval[i]}$ is calculated based on the value Nval[i] indicating the number of valid regions. Specifically, the evaluation value $B_{Nval[i]}$ is calculated according to formula (7) below. According to this formula, the greater Nval[i] an image has due to a large number of valid regions, the greater the evaluation value $B_{Nval[i]}$. This makes larger the mixture proportion of the image to the composite image.

$$B_{Nval[i]} = \frac{Nval[i]}{\sum_{i=1}^{4}(Nval[i])} \qquad (7)$$

The level of reliability B[i] calculated based on the evaluation values according to the formula (2) above is fed to the image addition circuit 34 shown in FIG. 1, and is used as the mixture proportion of the i-th image to the composite image when the images are combined (added) together to form the composite image.

Image Combining Processing

Next, the operation of the image combining circuit 36 shown in FIG. 1 when the shutter button 21 is depressed in the image stabilization shooting mode will be described.

Based on the entire motion vectors M calculated by the motion detection circuit 32, the coordinate transformation circuit 33 performs the positioning of the divided exposure images. At this point, the entire motion vector M found to be invalid in step S49 of FIG. 10 is regarded as 0 (regarded as a vector having a magnitude of 0).

Specifically, based on the entire motion vectors M, the coordinate transformation circuit 33 obtains the transformation matrix $H_i$ used in formula (8a) for coordinate transformation from image coordinates $(x_1, y_1)$ in the first image serving as a reference image to image coordinates $(x_i, y_i)$ in the i-th image. The transformation matrix $H_i$ is given by formula (8b) bellows.

$$\begin{bmatrix} x_i \\ y_i \\ 1 \end{bmatrix} = H_i \begin{bmatrix} x_1 \\ y_1 \\ 1 \end{bmatrix} \qquad (8a)$$

$$H_i = \begin{bmatrix} a_i & b_i & c_i \\ d_i & e_i & f_i \\ 0 & 0 & 1 \end{bmatrix} \qquad (8b)$$

Figure 15:
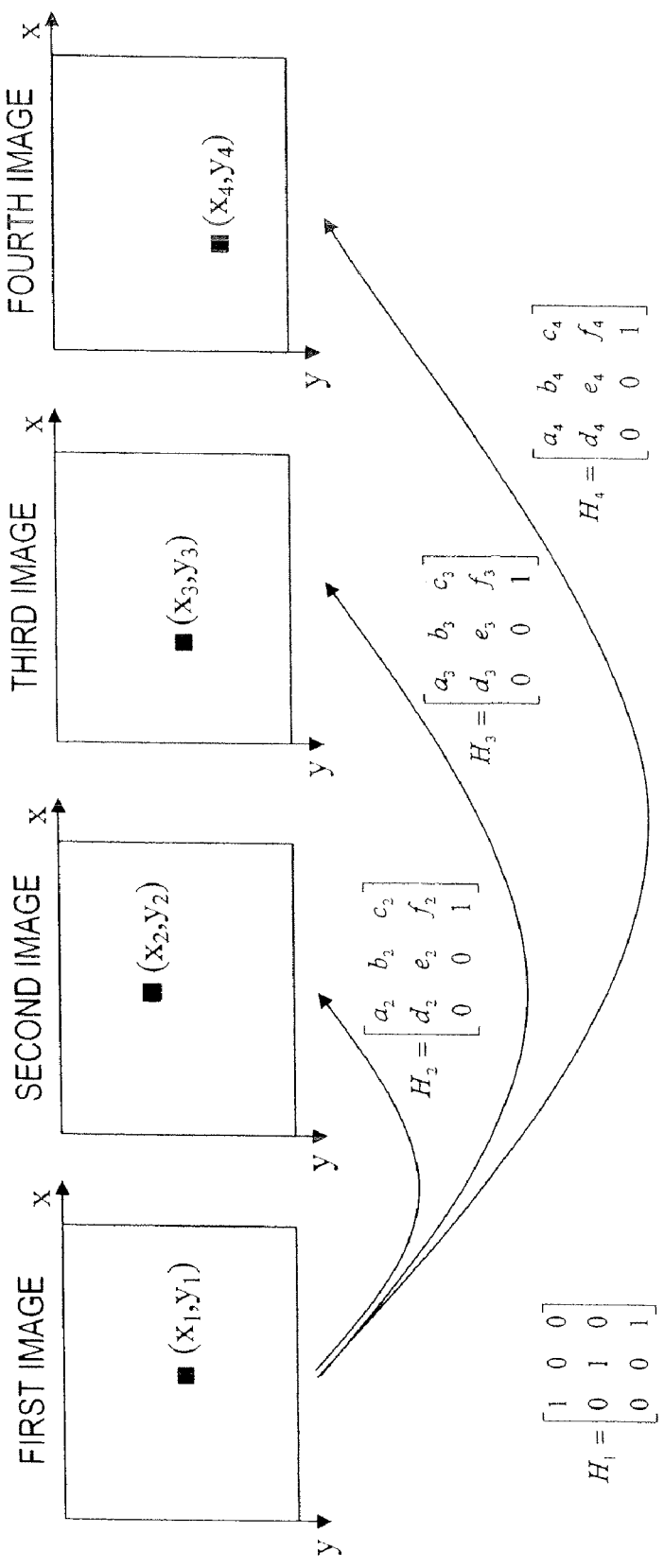
FIG. 15 is a diagram showing coordinate transformation performed by the coordinate transformation circuit shown in FIG. 1.

FIG. 15 shows coordinate transformation using the transformation matrix $H_i$. The displacement between the image coordinates $(x_1, y_1)$ in the first image and the image coordinates $(x_i, y_i)$ in the i-th image is represented by the entire motion vector M of the i-th image relative to the first image (i=2, 3, 4). Needless to say, the transformation matrix $H_1$ for the first image is $a_1=e_1=1$ and $b_1=c_1=d_1=f_1=0$.

Figure 16:
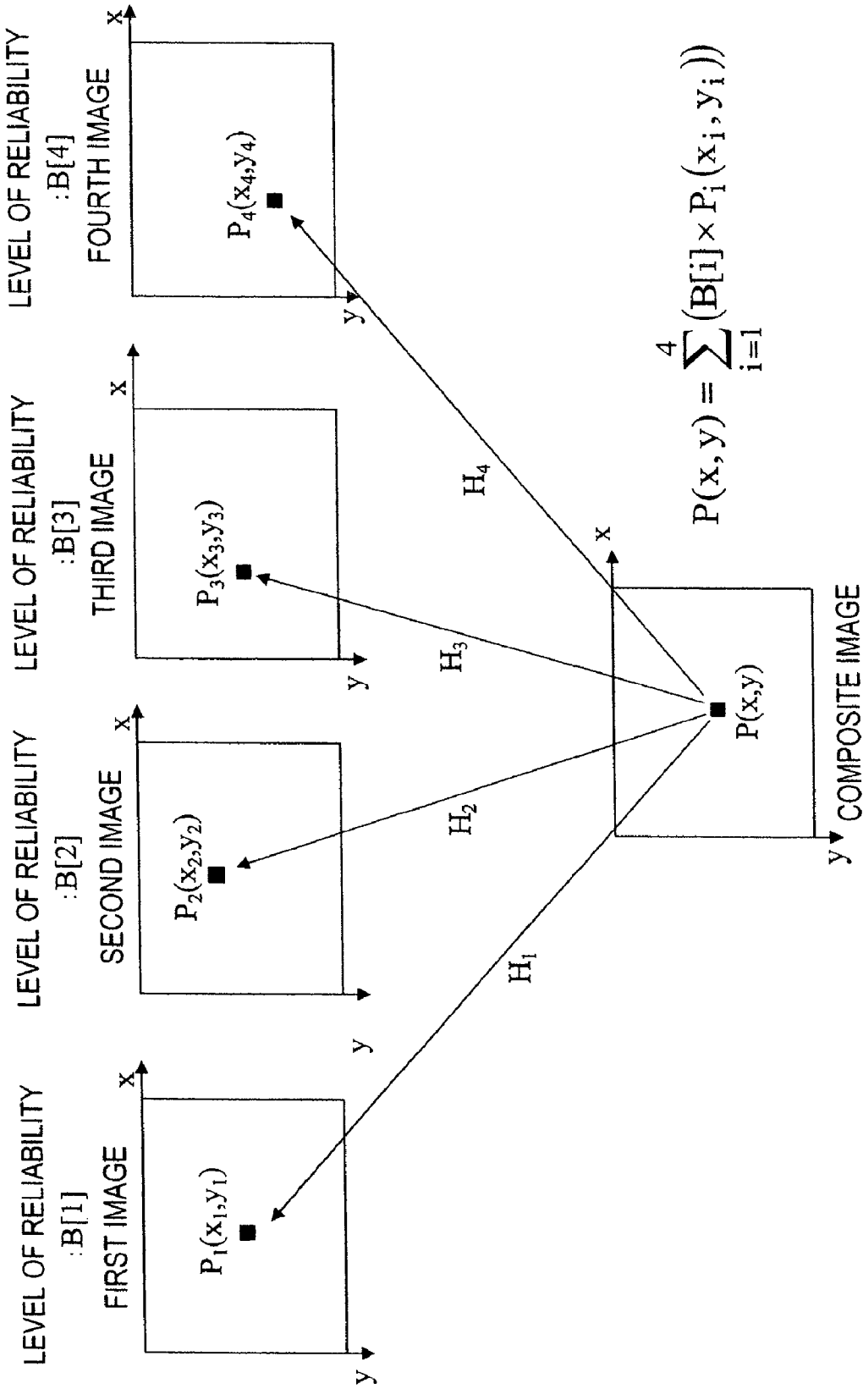
FIG. 16 is a diagram showing how the images are combined together one on top of another in the image addition circuit shown in FIG. 1.

To form a composite image of the first to fourth images in the image memory 35, the image addition circuit 34 shown in FIG. 1 sets in the image memory 35 the same image coordinate system as that of the first image serving as a reference image. Image coordinates in the image coordinate system set in the image memory 35 are represented by (x, y). Refer to FIG. 16 for the correlation between a pixel value of the composite image and a pixel value of the i-th image. A pixel value at the image coordinates (x, y) in the composite image is represented by P(x, y), and a pixel value at the image coordinates $(x_i, y_i)$ in the i-th image is represented by $P_i(x_i, y_i)$.

By using formulae (8a) and (8b) above, the image addition circuit 34 calculates, for each pixel of the composite image, the image coordinates of the corresponding pixel of each of the divided exposure images (the first to fourth images). Let the image coordinates of a certain pixel of the composite image be (x, y) (=$(x_1, y_1)$). Then, the image coordinates $(x_i, y_i)$ of the corresponding pixel of the i-th image are given by formulae (8a) and (8b). The image addition circuit 34 obtains, for each pixel (the image coordinates thereof is (x, y)) of the composite image, the pixel value $P_i(x_i, y_i)$ of the corresponding pixel of the i-th image. At this point, interpolation of the pixel value of the i-th image is performed as necessary (needless to say, the first image requires no interpolation).

The image addition circuit 34 then calculates the pixel value P(x, y) of each pixel of the composite image as follows. Based on the levels of reliability B[1] to B[4] used as the mixture proportions of the first to fourth images to the composite image, the pixel values $P_1(x_1, y_1)$ to $P_4(x_4, y_4)$ of the first to fourth images are weighted and added to obtain the pixel value P(x, y). The pixel value P(x, y) is given by formula (9) below.

$$P(x, y) = \sum_{i=1}^{4} (B[i] \times P_i(x_i, y_i)) \qquad (9)$$

Figure 26:
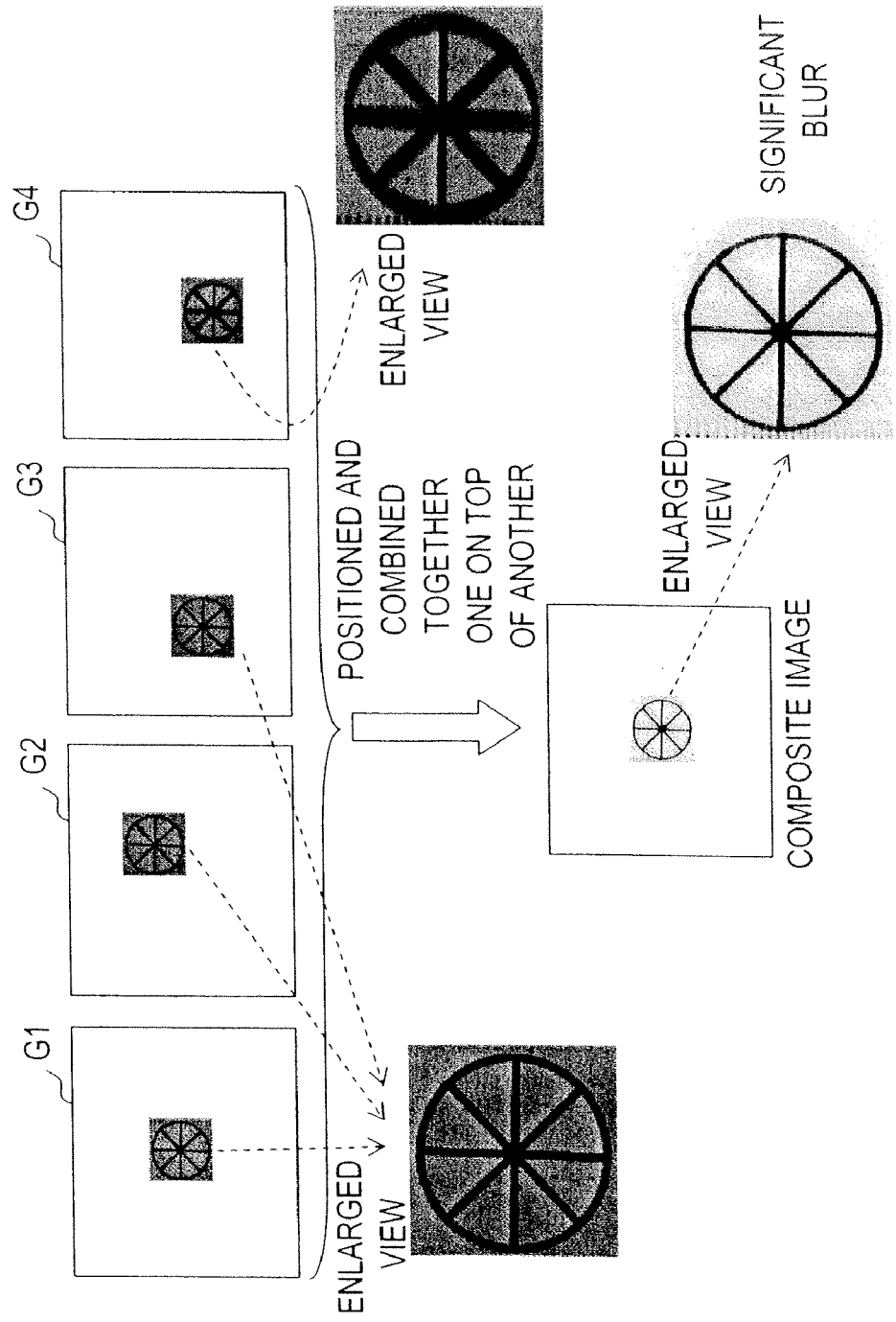
FIG. 26 is a diagram according to the conventional technology, showing the relationship between a plurality of divided exposure images and a composite image in image stabilization by image addition.

As described above, in this embodiment, the first to fourth images are combined together in proportions based on the levels of reliability B[1] to B[4] of the entire motion vectors M. When image stabilization by image addition is performed as described in this embodiment, the exposure time of each divided exposure image is set to be short enough to make camera shake negligible. This remarkably increases the degree of similarity among the divided exposure images. Still, a divided exposure image with a significant blur (such as G4 shown in FIG. 26) may be obtained on rare occasions. In such a case, the degree of similarity between the divided exposure image with a significant blur and the other divided exposure images tends to be relatively low.

Exploiting this tendency, based on the evaluation values reflecting, for example, the degree of similarity with the other divided exposure images or the amount of image blur, the proportion (the level of reliability B[i]) of each divided exposure image to the composite image is calculated, such that the mixture proportion of the divided exposure image with a low degree of similarity or a large amount of image blur to the composite image is reduced. As a result, even if N divided exposure images include an image, if any, with significant image blur mainly caused by camera shake or moving subject, degradation (typically, image blur) in the composite image resulting therefrom is prevented. This makes it possible to obtain a still image that suffers less from image blur (that is, a still image to which image stabilization is effectively performed).

As described above, all of the four evaluation values ($B_{Vmin[i]}$, $B_{Vave[i]}$, $B_{Nf[i]}$, and $B_{Nval[i]}$) indicate the accuracy of motion detection. The higher the accuracy with which the motion of a divided exposure image is detected, the higher the image combining circuit 36 makes the mixture proportion of the divided exposure image to the composite image; the lower the accuracy with which the motion of a divided exposure image is detected, the lower the image combining circuit 36 makes the mixture proportion of the divided exposure image to the composite image. This helps prevent degradation in the composite image resulting from the low accuracy of motion detection, making it possible to obtain a still image that suffers less from image blur (that is, a still image to which image stabilization is effectively performed).

Additionally, in this embodiment, to calculate a regional motion vector $M_k$, the smallest cumulative total correlation value and a cumulative total correlation value close to the smallest cumulative total correlation value are identified as potential smallest correlation values. In a case where two or more potential smallest correlation values are identified, an adopted smallest correlation value Vmin is selected from among the two or more potential smallest correlation values by referring to their neighborhood cumulative total correlation values. The significance of performing such processing (hereinafter "processing using neighborhood cumulative total correlation values) will be described. For the sake of simplicity, it is assumed that no consideration is given to a cumulative total correlation value, if any, close to the smallest cumulative total correlation value. It is also assumed that there are a plurality of smallest cumulative total correlation values (it is assumed that a certain group of cumulative total correlation values includes two or more smallest cumulative total correlation values).

When the motion between the images is detected by the representative point matching method, the smallest cumulative total correlation value may be detected at a plurality of sampling points S. One of the reasons is considered to be the influence of noise. The influence of noise becomes more pronounced for the divided exposure image with a relatively low brightness. Conventionally, when a plurality of smallest cumulative total correlation values are detected, it is judged that a true matching position is undetectable, making motion detection invalid.

Figures 17, 18:
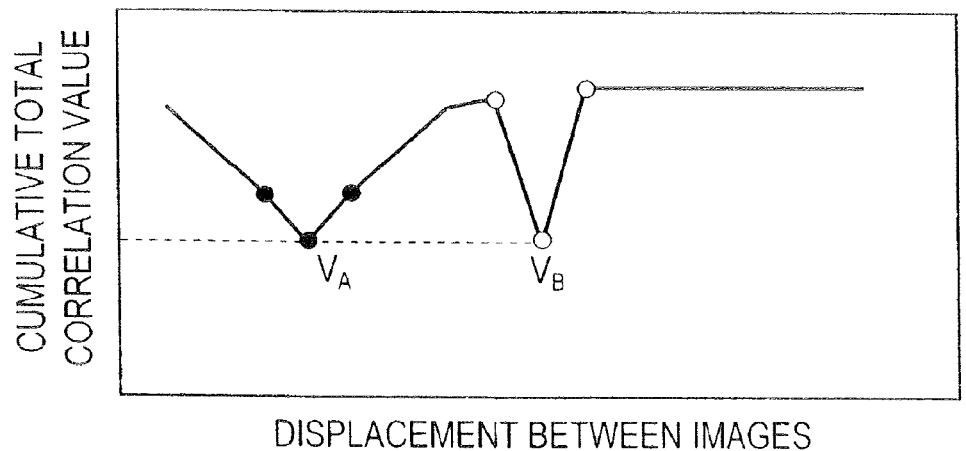
FIG. 17 is an illustration explaining the significance of the processing performed in step S17, or the like, of FIG. 9.
FIG. 18 is a table showing a specific example of different values according to a second embodiment of the invention.

FIG. 17 shows the distribution of cumulative total correlation values in a case where a plurality of smallest cumulative total correlation values are detected for a certain detection region as a result of comparison between the first and second images. In FIG. 17, the horizontal axis represents the displacement between the first and second images (relative positional difference between them), and the vertical axis represents the cumulative total correlation value. For the sake of simplifying the description and the drawing, FIG. 17 deals only with pixels in a one-dimensional array (for example, pixels arranged in a one-dimensional array in the horizontal direction). Now, suppose that the potential smallest correlation value $V_A$ corresponds to a true matching position, and the potential smallest correlation value $V_B$ is misidentified as a potential smallest correlation value due to noise.

Usually, noise occurs as a spike in an extremely narrow image region, and the brightness gradient of that image region is very sharp. Therefore, the neighborhood cumulative total correlation values of the cumulative total correlation value ($V_B$) corresponding to a false matching position due to the influence of noise are much higher than the cumulative total correlation value ($V_B$). As a result, when the average value of the potential smallest correlation value and the neighborhood cumulative total correlation values is calculated for each potential smallest correlation value, the average value calculated for the potential smallest correlation value $V_B$ misidentified as a potential smallest correlation value due to noise tends to be greater than the average value calculated for the potential smallest correlation value $V_A$ corresponding to a true matching position.

Since the processing in step S17, or the like, of FIG. 9 is performed with consideration given to this tendency, unlike the conventional method, it is possible to detect a true matching position without making the motion detection invalid. This makes it possible to detect with high accuracy a motion between the images having a low S/N ratio, and effectively perform image stabilization even in a dark place. In addition, in a case where image stabilization by image addition (still image stabilization by image addition) as described in this embodiment is performed, the accuracy of the motion detection can be secured even when the exposure division number is increased. This makes it possible to reduce the amount of camera shake in the still image thus obtained.

When the average image brightness is sufficiently high and the influence of noise is negligible, the smallest cumulative total correlation value is usually detected at one sampling point S (one pixel). This eliminates the need to use the neighborhood cumulative total correlation values. On the contrary, in such a case, too much consideration given to the neighborhood cumulative total correlation values can reduce the accuracy of detection of a true matching position (reduce the accuracy of motion detection). With consideration given to these circumstances, in this embodiment, as described above by referring to FIGS. 11A to 11E and FIG. 12, the number of neighborhood cumulative total correlation values used when a true matching position cannot be determined is increased in stages. This helps prevent the accuracy of motion detection from being reduced due to the use of neighborhood cumulative total correlation values.

As can be understood from the discussion above, it is preferable to perform the processing using neighborhood cumulative total correlation values in step S17, or the like, of FIG. 9. However, it is also possible to omit this processing in this embodiment and in the other embodiments described later. In that case, the potential smallest correlation value $V_A$ and the position $P_A$ corresponding thereto are used as an adopted smallest correlation value Vmin and a position Pmin corresponding thereto.

It has been described that, for each detection region, the calculation circuit 55 searches the cumulative total correlation value group for calculation for a cumulative total correlation value close to the smallest cumulative total correlation value $V_A$ (for instance, a cumulative total correlation value equal to or smaller than a value obtained by adding a predetermined threshold value (e.g., 2) to $V_A$), and identifies the cumulative total correlation value thus found as a potential smallest correlation value. However, it is also possible to identify only a cumulative total correlation value having the same value as the smallest cumulative total correlation value $V_A$ as a potential smallest correlation value.

Second Embodiment

The first embodiment described above deals with a case in which the level of reliability B[i] is calculated with consideration given to all of the four evaluation values ($B_{Vmin[i]}$, $B_{Vave[i]}$, $B_{Nf[i]}$, and $B_{Nval[i]}$). Alternatively, it is also possible to calculate the level of reliability B[i] with consideration given only to one, two, or three of the four evaluation values. In other words, any one, two, or three of the weighting coefficients $W_{Vmin}$, $W_{Vave}$, $W_{Nf}$, and $W_{Nval}$ may be set equal to zero (see formula (2) above). In this case, it is possible to omit the calculation of the evaluation value multiplied by a weighting coefficient of zero in formula (2) above.

A second embodiment deals with an example in which the level of reliability B[i] is calculated by using only the evaluation value $B_{Vmin[i]}$ corresponding to the smallest cumulative total correlation value. The second embodiment differs from the first embodiment only in that the level of reliability B[i] is calculated by using only the evaluation value $B_{Vmin[i]}$. In other respects, the second embodiment is the same as the first embodiment.

FIG. 18 is a table showing a specific example of different values to be calculated in the second embodiment. As is the case with the first embodiment, the second embodiment deals with a case in which four divided exposure images (first to fourth images) are obtained by divided exposures.

The level of reliability B[i] is calculated as follows (i=1, 2, 3, and 4). The reliability level calculating portion 74 (see FIG. 13) first calculates Vmin[1] to Vmin[4] by using the first image as a reference image (see FIG. 14), and then calculates the reciprocals of Vmin[1] to Vmin[4] thus obtained. Next, the reliability level calculating portion 74 calculates the sum of the reciprocals of Vmin[1] to Vmin[4]. Based on the sum thus obtained, the reliability level calculating portion 74 calculates the evaluation value $B_{Vmin[i]}$ according to formula (4) above. In the second embodiment, since $W_{Vmin}=1$ and $W_{Vave}=W_{Nf}=W_{Nval}=0$, $B[i]=B_{Vmin[i]}$. When $B[1]=B[2]=B[3]=B[4]$, the first to fourth images are simply combined together one on top of another.

Third Embodiment

The first and second embodiments deal with cases in which the first divided exposure image (the first image) of a plurality of divided exposure images obtained when the shutter button 21 is depressed is used as a reference image, based on which the calculation of the entire motion vector M and the positioning of the divided exposure images are performed; however, any of the plurality of divided exposure images may be used as a reference image.

Furthermore, a divided exposure image used as a reference image may be changed according to the values described above, such as Vmin. A third embodiment deals with a method for changing the reference image. The third embodiment is a partially modified version of the first embodiment, and all the features described in the first embodiment can be applied, unless inconsistent, to the third embodiment. For the sake of concreteness, as is the case with the first embodiment, the third embodiment also deals with a case in which four divided exposure images (first to fourth images) are obtained by divided exposures.

Figures 19, 20:
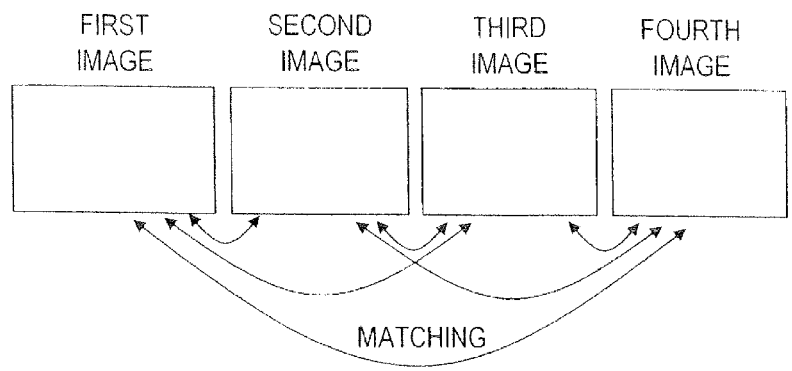
FIG. 19 is a diagram according to a third embodiment of the invention, showing how matching is performed between the images.
FIG. 20 is a table showing different values calculated in the third embodiment of the invention.

First, as shown in FIG. 19, the calculation of a cumulative total correlation value is performed by the representative point matching method for every combination of two images of the first to fourth images. That is, by the representative point matching method, a cumulative total correlation value is calculated between the first and second images, the first and third images, the first and fourth images, the second and third images, the second and fourth images, and the third and fourth images. Then, part or all of the processing in steps of FIG. 9 is performed for every combination of two images of the first to fourth images. In this way, an adopted smallest correlation value Vmin is calculated for each detection region for every combination of two images of the first to fourth images. Then, for each combination, the average value (for convenience sake, which will be referred to as the "average value $\alpha_1$" to distinguish it from other average value) of the adopted smallest correlation values Vmin of up to nine valid regions is calculated.

The average value $\alpha_1$ calculated between the first and second images, the average value $\alpha_1$ calculated between the first and third images, and the average value $\alpha_1$ calculated between the first and fourth images are equal to Vmin[2], Vmin[3], and Vmin[4] (FIG. 14), respectively, described in the first embodiment; in this embodiment, as shown in FIG. 20, they are represented by $Vmin_{12}$, $Vmin_{13}$, and $Vmin_{14}$, respectively. FIG. 20 is a table showing the correlation between different images and values corresponding thereto, such as $Vmin_{12}$. The average value $\alpha_1$ calculated between the second and third images, the average value $\alpha_1$ calculated between the second and fourth images, and the average value $\alpha_1$ calculated between the third and fourth images are represented by $Vmin_{23}$, $Vmin_{24}$, and $Vmin_{34}$, respectively. The sum of the values (such as $Vmin_{12}$) calculated between the i-th image and the other images is represented by $SUM_{Vmin}[i]$. That is, according to formulae (10a), (10b), (10c), and (10d) below, $SUM_{Vmin}[1]$ to $SUM_{Vmin}[4]$ are calculated. As will be clear from the sum calculation method described above, the smaller the sum, the higher the degree of similarity with the other images. That is, by using the image yielding a smaller sum as a reference image, it is possible to perform motion detection with higher accuracy and form a composite image suffering less from image degradation.

$$SUM_{Vmin}[1] = Vmin_{12} + Vmin_{13} + Vmin_{14} \quad (10a)$$

$$SUM_{Vmin}[2] = Vmin_{12} + Vmin_{23} + Vmin_{24} \quad (10b)$$

$$SUM_{Vmin}[3] = Vmin_{13} + Vmin_{23} + Vmin_{34} \quad (10c)$$

$$SUM_{Vmin}[4] = Vmin_{14} + Vmin_{24} + Vmin_{34} \quad (10d)$$

FIG. 21 is a table showing a specific example of different values calculated as described above. Now, let $Vmin_{12}$ be 50, $Vmin_{13}$ be 70, $Vmin_{14}$ be 200, $Vmin_{23}$ be 60, $Vmin_{24}$ be 180, and $Vmin_{34}$ be 170. Then, $SUM_{Vmin}[1]$ is 320, $SUM_{Vmin}[2]$ is 290, $SUM_{Vmin}[3]$ is 300, and $SUM_{Vmin}[4]$ is 550. Then, the reciprocals of $SUM_{Vmin}[1]$ to $SUM_{Vmin}[4]$ are calculated, and the sum of the reciprocals thus obtained is calculated. By using the sum thus obtained, the evaluation value $B_{Vmin[i]}$ is calculated according to formula (11) below. Substituting $SUM_{Vmin}[i]$ for Vmin[i] in formula (4) above gives formula (11) below.

$$B_{Vmin[i]} = \frac{\frac{1}{SUM_{Vmin}[i]}}{\sum_{i=1}^{4}\left(\frac{1}{SUM_{Vmin}[i]}\right)} \quad (11)$$

In this example, as shown in FIG. 21, $B_{Vmin[1]} \approx 0.267$, $B_{Vmin[2]} \leq 0.294$, $B_{Vmin[3]} \leq 0.284$, and $B_{Vmin[4]} \approx 10.155$. Needless to say, the largest evaluation value $B_{Vmin[i]}$ is calculated for the image yielding the smallest $SUM_{Vmin[i]}$.

In the third embodiment, the other evaluation values $B_{Vave[i]}$, $B_{Nf[i]}$, and $B_{Nval[i]}$ are calculated in the same manner. When calculating the other evaluation values $B_{Vave[i]}$, $B_{Nf[i]}$, and $B_{Nval[i]}$, the calculation of a cumulative total correlation value is performed by the representative point matching method for every combination of two images of the first to fourth images.

When calculating the evaluation value $B_{Vave[i]}$, part or all of the processing in steps of FIG. 9 is performed for every combination of two images of the first to fourth images. In this way, the average value Vave of the cumulative total correlation values is calculated for each detection region for every combination of two images of the first to fourth images. Then, the average value (for convenience sake, which will be referred to as the "average value $\alpha_2$" to distinguish it from other average value) of the average values Vave of up to nine valid regions is calculated for every combination of two images of the first to fourth images. The average value $\alpha_2$ calculated between the first and second images is represented by $Vave_{12}$, the average value $\alpha_2$ calculated between the first and third images is represented by $Vave_{13}$, the average value $\alpha_2$ calculated between the first and fourth images is represented by $Vave_{14}$, the average value $\alpha_2$ calculated between the second and third images is represented by $Vave_{23}$, the average value $\alpha_2$ calculated between the second and fourth images is represented by $Vave_{24}$, and the average value $\alpha_2$ calculated between the third and fourth images is represented by $Vave_{34}$. Then, $SUM_{Vave}[1]$ to $SUM_{Vave}[4]$ are calculated according to the formulae below.

$$SUM_{Vave}[1] = Vave_{12} + Vave_{13} + Vave_{14}$$

$$SUM_{Vave}[2] = Vave_{12} + Vave_{23} + Vave_{24}$$

$$SUM_{Vave}[3] = Vave_{13} + Vave_{23} + Vave_{34}$$

$$SUM_{Vave}[4] = Vave_{14} + Vave_{24} + Vave_{34}$$

Finally, the evaluation value $B_{Vave[i]}$ is calculated according to formula (12) below. Note that $Vave_{12}$, $Vave_{13}$, and $Vave_{14}$ are equal to Vave[2], Vave[3], and Vave[4], respectively, described in the first embodiment (see FIG. 14).

$$B_{Vave[i]} = \frac{SUM_{Vave}[i]}{\sum_{i=1}^{4}(SUM_{Vave}[i])} \quad (12)$$

When calculating the evaluation value $B_{Nf[i]}$, part or all of the processing in steps of FIG. 9 is performed for every combination of two images of the first to fourth images. In this way, the number Nf of potential smallest correlation values is calculated for each detection region for every combination of two images of the first to fourth images. Then, the average value (for convenience sake, which will be referred to as the "average value $\alpha_3$" to distinguish it from other average value) of the numbers Nf of up to nine valid regions is calculated for every combination of two images of the first to fourth images. The average value $\alpha_3$ calculated between the first and second images is represented by $Nf_{12}$, the average value $\alpha_3$ calculated between the first and third images is represented by $Nf_{13}$, the average value $\alpha_3$ calculated between the first and fourth images is represented by $Nf_{14}$, the average value $\alpha_3$ calculated between the second and third images is represented by $Nf_{23}$, the average value $\alpha_3$ calculated between the second and fourth images is represented by $Nf_{24}$, and the average value $\alpha_3$ calculated between the third and fourth images is represented by $Nf_{34}$. Then, $SUM_{Nf}[1]$ to $SUM_{Nf}[4]$ are calculated according to the formulae below.

$$SUM_{Nf}[1] = Nf_{12} + Nf_{13} + Nf_{14}$$

$$SUM_{Nf}[2] = Nf_{12} + Nf_{23} + Nf_{24}$$

$$SUM_{Nf}[3] = Nf_{13} + Nf_{23} + Nf_{34}$$

$$SUM_{Nf}[4] = Nf_{14} + Nf_{24} + Nf_{34}$$

Finally, according to formula (13) below, the evaluation value $B_{Nf[i]}$ is calculated. Note that $Nf_{12}$, $Nf_{13}$, and $Nf_{14}$ are equal to Nf[2], Nf[3], and Nf[4], respectively, described in the first embodiment (see FIG. 14).

$$B_{Nf[i]} = \frac{\frac{1}{SUM_{Nf}[i]}}{\sum_{i=1}^{4}\left(\frac{1}{SUM_{Nf}[i]}\right)} \quad (13)$$

When calculating the evaluation value $B_{Nval[i]}$, part or all of the processing in steps of FIG. 9 is performed for every combination of two images of the first to fourth images. In this way, the number of valid regions is calculated for every combination of two images of the first to fourth images. The number of valid regions calculated between the first and second images is represented by $Nval_{12}$, the number of valid regions calculated between the first and third images is represented by $Nval_{13}$, the number of valid regions calculated between the first and fourth images is represented by $Nval_{14}$, the number of valid regions calculated between the second and third images is represented by $Nval_{23}$, the number of valid regions calculated between the second and fourth images is represented by $Nval_{24}$, and the number of valid regions calculated between the third and fourth images is represented by $Nval_{34}$. Then, $SUM_{Nval}[1]$ to $SUM_{Nval}[4]$ are calculated according to the formulae below.

$$SUM_{Nval}[1] = Nval_{12} + Nval_{13} + Nval_{14}$$

$$SUM_{Nval}[2] = Nval_{12} + Nval_{23} + Nval_{24}$$

$$SUM_{Nval}[3] = Nval_{13} + Nval_{23} + Nval_{34}$$

$$SUM_{Nval}[4] = Nval_{14} + Nval_{24} + Nval_{34}$$

Finally, according to formula (14) below, the evaluation value $B_{NVal[i]}$ is calculated. Note that $Nval_{12}$, $Nval_{13}$, and $Nval_{14}$ are equal to Nval[2], Nval[3], and Nval[4], respectively, described in the first embodiment (see FIG. 14).

$$B_{Nval[i]} = \frac{SUM_{Nval}[i]}{\sum_{i=1}^{4}(SUM_{Nval}[i])} \quad (14)$$

As is the case with the first embodiment, the reliability level calculating portion 74 calculates the level of reliability B[i] according to formula (2) above by using the four evaluation values ($B_{Vmin[i]}$, $B_{Vave[i]}$, $B_{Nf[i]}$, and $B_{Nval[i]}$) given by formulae (11) to (14) above. In addition, the reliability level calculating portion 74 sets the divided exposure image corresponding to the highest of the levels of reliability B[1] to B[4] as a reference image. The image combining circuit 36 performs the positioning of the divided exposure images with respect to the reference image, and combines the divided exposure images together one on top of another so as to form a composite image as a still image. This positioning is performed according to the entire motion vectors M calculated by using the divided exposure image having the highest level of reliability as a reference image and using the other divided exposure images as non-reference images.

As described in the second embodiment, also in the third embodiment, any one, two, or three of the weighting coefficients $W_{Vmin}$, $W_{Vave}$, $W_{Nf}$, and $W_{Nval}$ may be set equal to zero (see formula (2) above). In this case, it is possible to omit the calculation of the evaluation value multiplied by a weighting coefficient of zero in formula (2) above.

Consider a case where $W_{Vmin}=1$ and $W_{Vave}=W_{Nf}=W_{Nval}=0$. Then, $B[i]=B_{Vmin[i]}$. In this case, in the example shown in FIG. 21, since $B_{Vmin[2]}$ is the largest value of the evaluation values $B_{Vmin[1]}$ to $B_{Vmin[4]}$, the images are positioned and combined together one on top of another by using the second image as a reference image.

It is considered that the greater the evaluation value $B_{Vmin[i]}$ calculated according to formula (11) above, the higher the degree of similarity between the divided exposure image (the i-th image) corresponding to that evaluation value and the other divided exposure images. Thus, the greater the evaluation value $B_{Vmin[i]}$ of the divided exposure image used as a reference image, the higher the probability of detecting an accurate entire motion vectors M between the divided exposure image used as a reference image and the other divided exposure images, and the less the composite image suffers from image blur.

Likewise, it is considered that the greater the evaluation value $B_{Vave[i]}$ calculated according to the formula (12) above, the less the divided exposure image (the i-th image) corresponding to that evaluation value suffers from blur resulting from camera shake, moving subject, defocusing, or the like. Thus, the greater the evaluation value $B_{Vave[i]}$ of the divided exposure image used as a reference image, the higher the probability of detecting an accurate entire motion vectors M between the divided exposure image used as a reference image and the other divided exposure images, and the less the composite image suffers from image blur.

It is considered that the greater the evaluation value $B_{Nf[i]}$ calculated according to formula (13) above, the fewer similar patterns are observed in the divided exposure image (i-th image) corresponding to that evaluation value. Thus, the greater the evaluation value $B_{Nf[i]}$ of the divided exposure image used as a reference image, the higher the probability of detecting an accurate entire motion vectors M between the divided exposure image used as a reference image and the other divided exposure images, and the less the composite image suffers from image blur.

The greater the evaluation value $B_{Nval[i]}$ calculated according to formula (14) above, the greater the number of detection regions of the divided exposure image (the i-th image) corresponding to that evaluation value are judged to be valid. Thus, the greater the evaluation value $B_{Nval[i]}$ of the divided exposure image used as a reference image, the higher the probability of detecting an accurate entire motion vectors M between the divided exposure image used as a reference image and the other divided exposure images, and the less the composite image suffers from image blur.

The positioning (the coordinate transformation) results in image degradation in the divided exposure images other than the reference image due to interpolation of the pixel value, for example. However, by performing the positioning (the coordinate transformation) by selecting the divided exposure image of high reliability (having a high degree of similarity with other divided exposure images) as a reference image and combining the divided exposure images together one on top of another, it is possible to minimize image degradation caused by the coordinate transformation.

For example, as shown in FIG. 22, consider a case where the second to fourth images are nearly identical to one another, and the first image is such an image as obtained by moving the second image linearly while rotating it. In this case, if the images are positioned by using the first image as a reference image, and are then combined together one on top of another, the second to fourth images suffer a relatively large image degradation. On the other hand, if the images are positioned by using the second image as a reference image, and are then combined together one on top of another, the third and fourth images suffer little image degradation. This helps form a composite image with higher quality.

Therefore, in this case, it is preferable to set the second image (or the third or fourth image) as a reference image. According to the way of calculating the level of reliability B[i] as described in this embodiment, the second image (or the third or fourth image) having a high degree of similarity with other images is given with a high level of reliability B[i], and is set as a reference image.

Image degradation caused by the positioning (the coordinate transformation) can be prevented by simply selecting a reference image for the positioning based on the level of reliability. Therefore, in the third embodiment, the divided exposure images (the first to fourth images) may be combined together in equal proportions to form a composite image. That is, the first to fourth images may be positioned and simply combined together one on top of another in equal proportions to form a composite image (a still image). Needless to say, like the first embodiment, the pixel value P(x, y) of each pixel of a composite image may be calculated according to formula (9) above by using the level of reliability B[i] as the mixture proportion of each divided exposure image to the composite image; given the description of the first embodiment, doing so is preferable.

The descriptions heretofore deal with a method for determining a reference image (and a reference image used for detecting the entire motion vector M) for the positioning based on the evaluation values calculated by formulae (11) to (14). Alternatively, a variable i that gives the smallest $SUM_{Vmin}[i]$, a variable i that gives the greatest $SUM_{Vave}[i]$, a variable i that gives the smallest $SUM_{Nf}[i]$, or a variable i that gives the greatest $SUM_{Nval}[i]$ may be specified without using formulae (11) to (14) so as to set the divided exposure image (for example, the second image) corresponding to the specified variable i (for example, i=2) as a reference image. Then, based on the reference image (for example, the second image) thus determined, the same processing as the first embodiment including the processing in steps of FIGS. 9 and 10 is performed, thereby performing the calculation of the entire motion vector M, the positioning of the images, and the formation of the composite image.

Modifications and Variations

It should be understood that any specific values appearing in the descriptions that have been given hitherto are presented merely as preferred examples and can be changed to other values.

It is to be understood, however, that the imaging apparatus specifically described above is given merely as an example, and, in implementing the present invention, many modifications and variations (or other embodiments) are possible. The imaging apparatus of the invention may be modified as follows. Any feature of modified examples 1 to 9 described below can be applied, unless inconsistent, to any modified example other than that in connection with which the feature is specifically described.

MODIFIED EXAMPLE 1

The descriptions heretofore deals with cases where the value represented by symbol "Vave" based on which the evaluation value $B_{Vave[i]}$ is calculated is the average value of a plurality of cumulative total correlation values (i.e., the above-mentioned cumulative total correlation value group for calculation) calculated for each detection region. Alternatively, the symbol "Vave" may be considered to be the sum of the plurality of cumulative total correlation values (that is, the product of the number of cumulative total correlation values multiplied by the average value thereof). That is, the evaluation value $B_{V_{ave}[i]}$ is calculated based on the value commensurate with the average value of a plurality of cumulative total correlation values calculated for each detection region.

MODIFIED EXAMPLE 2

The embodiments described above deal with cases where a representative point matching method, which is one of image matching methods, is used. Alternatively, the present invention can be implemented by any other image matching method. For example, instead of the representative point matching method, it is possible to use a pixel-by-pixel matching method (a block matching method).

The pixel-by-pixel matching method is also performed for two divided exposure images to be compared, each being divided into nine detection regions ($E_1$ to $E_9$). An image in a detection region of one divided exposure region and an image in a corresponding detection region of the other divided exposure region are placed one on top of another and are gradually shifted from each other. In this way, a plurality of cumulative total correlation values (also called matching errors) corresponding to a positional difference (displacement) between the two divided exposure images are calculated. The cumulative total correlation values thus calculated have the same characteristics as those specifically described in the embodiments. Based on the plurality of cumulative total correlation values thus calculated, it is possible to perform the same processing as that specifically described in the above-described embodiments, including the calculation of a motion vector.

MODIFIED EXAMPLE 3

The embodiments described above deal with cases where a pattern of neighborhood cumulative total correlation values used when a true matching position cannot be determined is changed from the pattern shown in FIG. 11A to the pattern shown in FIG. 11B, to the pattern shown in FIG. 11C, to the pattern shown in FIG. 11D, and to the pattern shown in FIG. 11E; however, it is also possible to omit processing using any of the above-described patterns.

For example, a pattern of neighborhood cumulative total correlation values used when a true matching position cannot be determined may be changed from the pattern shown in FIG. 11A to the pattern shown in FIG. 11C, and to the pattern shown in FIG. 11E. That is, if it is judged that the selection is impossible in step S102 of FIG. 12 (N in step S102), the procedure may directly proceed to step S105 without performing the processing in steps S103 and S104; if it is judged that the selection is impossible in step S106 of FIG. 12 (N in step S106), the procedure may directly proceed to step S109 without performing the processing in steps S107 and S108. Likewise, the pattern shown in FIG. 11B may be used as a reference pattern, such that a pattern of neighborhood cumulative total correlation values used when a true matching position cannot be determined is directly changed from the pattern shown in FIG. 11B to the pattern shown in FIG. 11E.

MODIFIED EXAMPLE 4

The embodiments described above deal with cases where the number of neighborhood cumulative total correlation values used when a true matching position cannot be determined is gradually increased (see FIGS. 11A to 11E and FIG. 12); however, the number of neighborhood cumulative total correlation values does not necessarily have to be increased.

For example, in a case where all the differences between the smallest average value of the four average values calculated in step S101 and the other average values are equal to or smaller than a predetermined difference threshold value (e.g., 2), the following first and second steps may be performed before the procedure proceeds from step S1102 to step S103.

Figure 23:
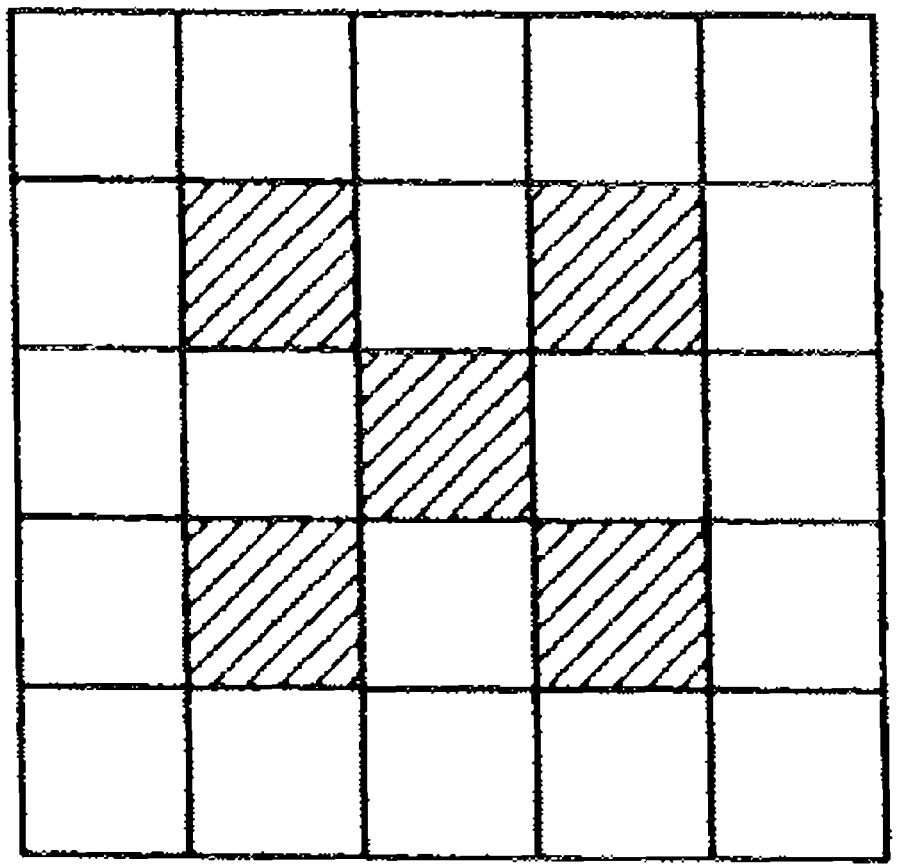
Figure 24:
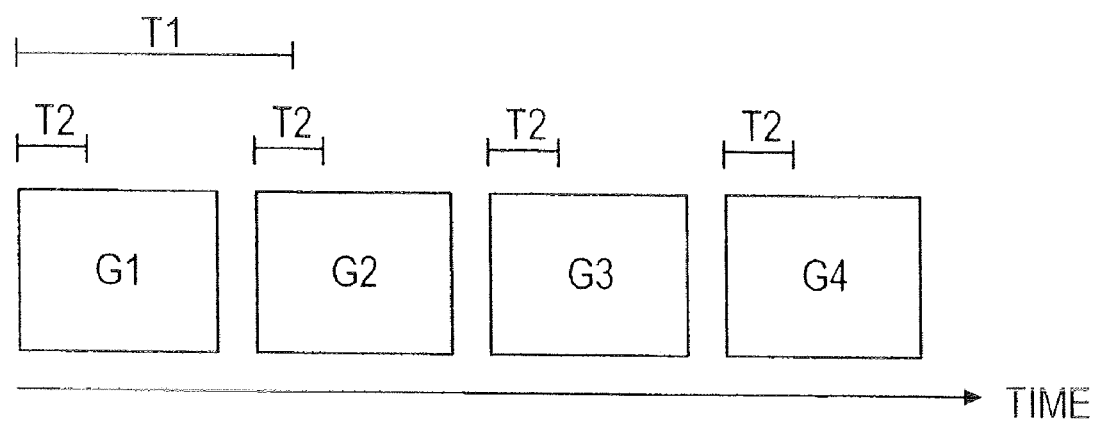
FIG. 24 is a diagram according to a conventional technology, showing the principle of image stabilization by image addition.
Figure 25:
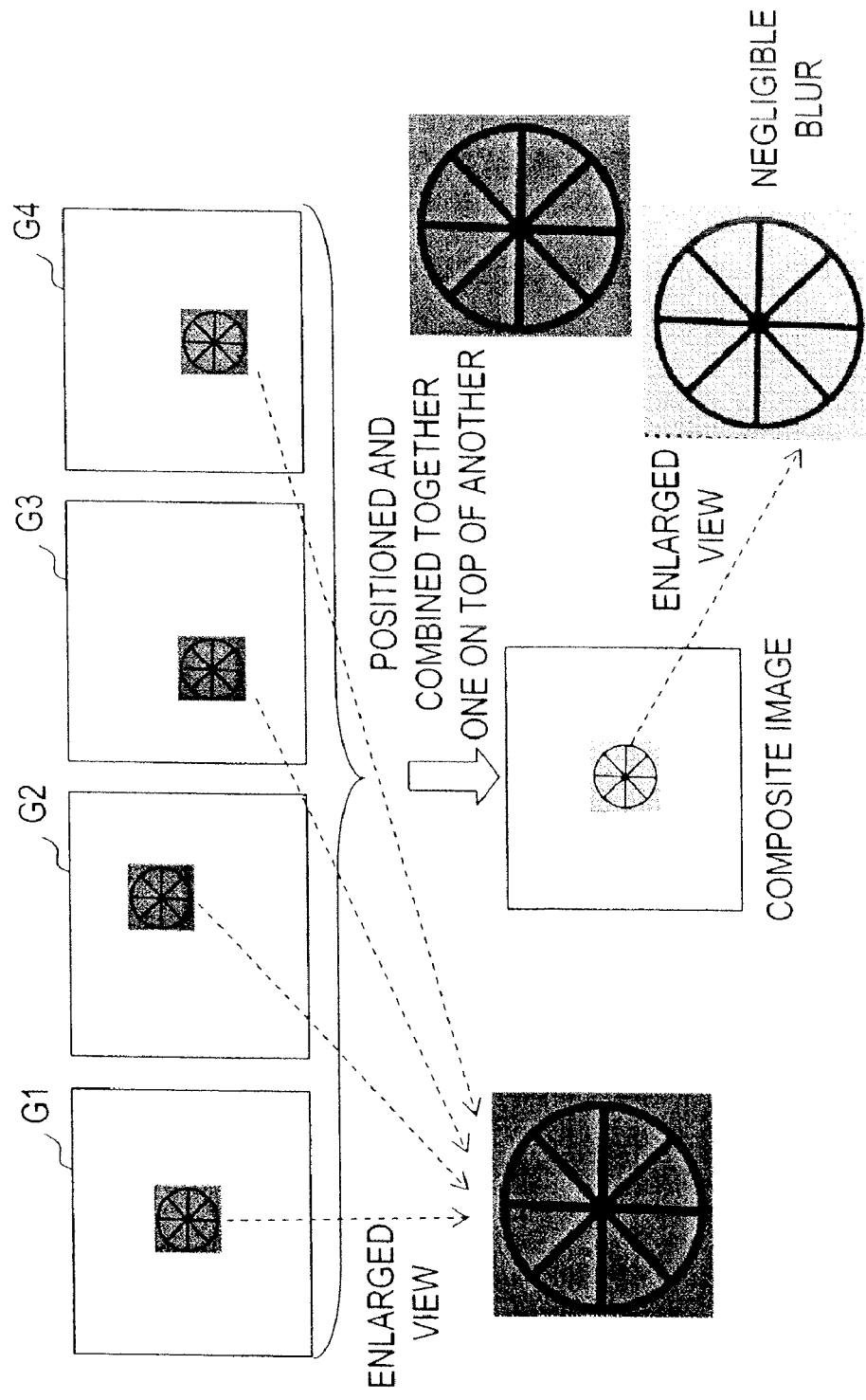
FIG. 25 is a diagram according to the conventional technology, showing the relationship between a plurality of divided exposure images and a composite image in image stabilization by image addition.

In the first step, the average value (evaluation value for selection) of the potential smallest correlation value and four neighborhood cumulative total correlation values that form the pattern shown in FIG. 23 is calculated for each of the first to fourth block data (that is, for each potential smallest correlation value). That is, when $(p, q)=(-1, -1), (-1, 1), (1, -1), (1, 1)$, and $(0, 0)$, the average value $V_{A\_ave}$ of the cumulative total correlation values $V(i_A+p, j_A+q)$, the average value $V_{B\_ave}$ of the cumulative total correlation values $V(i_B+p, j_B+q)$, the average value $V_{C\_ave}$ of the cumulative total correlation values $V(i_C+p, j_C+q)$, and the average value $V_{D\_ave}$ of the cumulative total correlation values $V(i_D+p, j_D+q)$ are calculated.

Then, in the second step, the four average values calculated in the first step are compared with each other. If all the differences between the smallest average value of the four average values and the other average values are equal to or smaller than a predetermined difference threshold value (e.g., 2), the procedure proceeds to step S103. If not, the procedure proceeds to step S112, and the potential smallest correlation value corresponding to the smallest average value of the four average values calculated in the first step is selected as the adopted smallest correlation value Vmin.

Even when a true matching position cannot be determined by using the four neighborhood cumulative total correlation values shown in FIG. 11A, the use of the four neighborhood cumulative total correlation values shown in FIG. 23 may permit the detection of the true matching position. With consideration given to that possibility, the processing described above is adopted.

MODIFIED EXAMPLE 5

The descriptions heretofore deal with cases where neighborhood cumulative total correlation values within a region of up to 5×5 pixels centered around a position (e.g., $P_A$) corresponding to a potential smallest correlation value (e.g., $V_A$) are used (see FIGS. 11A to 11E and FIG. 12). It is to be understood, however, that the number of neighborhood cumulative total correlation values specifically described above is given merely as an example, and many modifications and variations are possible. For example, neighborhood cumulative total correlation values within a region of up to 7×7 pixels centered around a position (e.g., $P_A$) corresponding to a potential smallest correlation value (e.g., $V_A$) may be used to select an adopted smallest correlation value Vmin.

MODIFIED EXAMPLE 6

With reference to FIG. 12, the descriptions heretofore deal with cases where the average value of the potential smallest correlation value and neighborhood cumulative total correlation values is calculated as the evaluation value for selection for each of the first to fourth block data (that is, for each potential smallest correlation value), so that an adopted smallest correlation value Vmin is selected by comparing the calculated evaluation values for selection with each other.

Alternatively, the average value calculated as the evaluation value for selection may be changed to the sum or weighted average.

That is, for example, in step S101 of FIG. 12, the sum of a total of five cumulative total correlation values $V(i_A+p, j_A+q)$ when $(p, q)=(0,-1), (-1, 0), (0, 1), (1, 0)$, and $(0, 0)$ may be calculated as the evaluation value for selection.

When the evaluation value for selection is calculated as the weighted average, in step S101 of FIG. 12, for example, it is necessary simply to obtain $V_{A\_ave}$ as follows.

$$V_{A\_ave}=k_1 \cdot V(i_A,j_A-1)+k_2 \cdot V(i_A-1,j_A)+k_3 \cdot V(i_A,j_A+1)+k_4 \cdot V(i_A+1,j_A)+k_0 \cdot V(i_A,j_A)$$

where $k_0$ to $k_4$ are coefficients for calculating the weighted average. For example, $k_1=k_2=k_3=k_4<k_0$ holds.

MODIFIED EXAMPLE 7

The descriptions heretofore deal with cases where the average value (or the sum or the weighted average) of the potential smallest correlation value and neighborhood cumulative total correlation values is calculated as the evaluation value for selection for each of the first to fourth block data, so that an adopted smallest correlation value Vmin is selected by comparing the calculated evaluation values for selection with each other. Alternatively, the evaluation value for selection may be calculated only from the neighborhood cumulative total correlation values.

That is, for example, in step S103 of FIG. 12, the average value (or the sum or the weighted average) of a total of eight cumulative total correlation values $V(i_A+p, j_A+q)$ when $(p, q)=(-1, -1), (-1, 0), (-1, 1), (0, -1), (0, 1), (1, -1), (1, 0)$, and $(1, 1)$ may be calculated as $V_{A\_ave}$.

MODIFIED EXAMPLE 8

The descriptions heretofore deal with cases where nine detection regions ($E_1$ to $E_9$) are provided in each image (such as divided exposure image). The number of detection regions is not limited to nine; any number of detection regions may be provided in each image. For example, the number of detection regions provided in each image may be one.

MODIFIED EXAMPLE 9

The imaging apparatus shown in FIG. 1 can be achieved with hardware or a combination of hardware and software. In particular, the functions of the image stabilization circuit 30 shown in FIG. 1 and the functions of the motion detection circuit 32, the coordinate transformation circuit 33, and the image addition circuit 34 can be individually achieved with hardware, software, or a combination of hardware and software.

In a case where the functions of the image stabilization circuit 30 are achieved with software, all or part of FIG. 1, FIG. 2, FIG. 3, and FIG. 13 show functional blocks of the image stabilization circuit 30 (part or all of the image stabilization circuit 30). Incidentally, all or part of the functions of the image stabilization circuit 30 may be achieved by writing them as programs and making the computer execute these programs.

Notes

In FIG. 1, the motion detection circuit 32 serves as a motion vector calculating portion, and the motion detection circuit 32 (in particular, the reliability level calculating portion 74 shown in FIG. 13) serves as a mixture proportion calculating portion. In the third embodiment, the function of a reference image setting portion that changes the reference image based on the level of reliability is achieved with the motion detection circuit 32 (in particular, the reliability level calculating portion 74 shown in FIG. 13) or the image addition circuit 34. An image combining device including the motion vector calculating portion and the mixture proportion calculating portion or the reference image setting portion is achieved with the image stabilization circuit 30 shown in FIG. 1.

What is claimed is:

1. An image combining device comprising:
  a motion vector calculating portion which calculates a motion vector between different divided exposure images of a plurality of divided exposure images obtained as a result of continuous shooting,
  wherein the image combining device positions the divided exposure images based on the motion vector thus calculated, and combines the divided exposure images together one on top of another so as to form one composite image,
  wherein the image combining device further comprises:
    a mixture proportion calculating portion which calculates, based on information commensurate with a motion of an image between the different divided exposure images, a mixture proportion of each divided exposure image to the composite image,
    wherein the image combining device combines the divided exposure images together one on top of another in mixture proportions thus calculated so as to form the composite image,
  wherein the motion vector calculating portion calculates the motion vector based on a plurality of cumulative total correlation values between the different divided exposure images, the plurality of cumulative total correlation values being obtained by an image matching method,
  wherein the mixture proportion calculating portion calculates the mixture proportions based on the plurality of cumulative total correlation values used as the information.

2. The image combining device of claim 1,
  wherein each divided exposure image is provided with a detection region,
  wherein the motion vector calculating portion calculates, by the image matching method, m cumulative total correlation values (m is an integer equal to or greater than 2) between the different divided exposure images with respect to the detection region,
  wherein the mixture proportion calculating portion calculates the mixture proportions based on one or more evaluation values of first, second, and third evaluation values,
  wherein the first evaluation value is an evaluation value based on a smallest cumulative total correlation value of the m cumulative total correlation values, or the first evaluation value is an evaluation value based on a cumulative total correlation value equal to or smaller than a value obtained by increasing the smallest cumulative total correlation value according to a predetermined rule,
  wherein the second evaluation value is an evaluation value based on a value commensurate with an average of the m cumulative total correlation values,
  wherein the third evaluation value is an evaluation value based on a number of smallest cumulative total correlation values of the m cumulative total correlation values, or the third evaluation value is an evaluation value based on a number of cumulative total correlation values equal to or smaller than a value obtained by increasing the smallest cumulative total correlation value according to a predetermined rule.

3. The image combining device of claim 1, wherein each divided exposure image is provided with a plurality of detection regions, wherein the motion vector calculating portion calculates, by the image matching method, m cumulative total correlation values (m is an integer equal to or greater than 2) between the different divided exposure images with respect to each detection region, wherein the image combining device further comprises a checking portion which checks whether each detection region is valid or invalid, wherein, based on the m cumulative total correlation values, the motion vector calculating portion obtains, for each detection region, a vector indicating a motion of an image within the detection region as a regional motion vector, wherein the motion vector calculating portion calculates, as a motion vector of an entire image, the motion vector from the regional motion vector corresponding to the detection region found to be valid, wherein the mixture proportion calculating portion calculates the mixture proportions based on one or more evaluation values of first, second, third, and fourth evaluation values, wherein the first evaluation value is calculated based on a smallest cumulative total correlation value of the m cumulative total correlation values, the smallest cumulative total correlation value being obtained for each detection region, or the first evaluation value is calculated based on a cumulative total correlation value equal to or smaller than a value obtained by increasing the smallest cumulative total correlation value according to a predetermined rule, the cumulative total correlation value being obtained for each detection region, wherein the second evaluation value is calculated based on a value commensurate with an average of the m cumulative total correlation values, the value being obtained for each detection region, wherein the third evaluation value is calculated based on a number of smallest cumulative total correlation values of the m cumulative total correlation values, the number being obtained for each detection region, or the third evaluation value is calculated based on a number of cumulative total correlation values equal to or smaller than a value obtained by increasing the smallest cumulative total correlation value according to a predetermined rule, the number being obtained for each detection region, wherein the fourth evaluation value is calculated based on a number of detection regions of the plurality of detection regions, the number of detection regions being found to be valid by the checking portion.

4. An imaging apparatus comprising:

an imaging portion which performs continuous shooting and outputs a plurality of image data indicating a plurality of divided exposure images; and the image combining device of claim 1, wherein the image combining device forms the composite image based on the plurality of image data.

5. An image combining method comprising:

a first step which calculates a motion vector between different divided exposure images of a plurality of divided exposure images obtained as a result of continuous shooting; and a second step which positions the divided exposure images based on the motion vector thus calculated, and combines the divided exposure images together one on top of another so as to form one composite image, wherein, based on information commensurate with a motion of an image between the different divided exposure images, a mixture proportion of each divided exposure image to the composite image is calculated, wherein the divided exposure images are combined together one on top of another in mixture proportions thus calculated so as to form the composite image, wherein the motion vector is calculated based on a plurality of cumulative total correlation values between the different divided exposure images, the plurality of cumulative total correlation values being obtained by an image matching method, wherein the mixture proportions are calculated based on the plurality of cumulative total correlation values used as the information.

* * * * *